3,392,129
ESTER POLYOL-CARBOXYLIC ACID ADDUCTS AND WATER-BASED PAINT COMPOSITIONS THEREFROM

Kenneth L. Hoy, St. Albans, and Paul C. Payne, South Charleston, W. Va., assignors to Union Carbide Corporation, a corporation of New York
No Drawing. Filed Jan. 7, 1965, Ser. No. 424,112
19 Claims. (Cl. 260—22)

ABSTRACT OF THE DISCLOSURE

Ester polyol-carboxylic acid adducts having pendant carboxyl groups which are prepared by the adduction of $\alpha,\beta$-ethylenically unsaturated polycarboxylic acids or anhydrides to a significantly defined ethylenically unsaturated polyester. These adducts, after being rendered water compatible by the reaction of the pendant carboxyl groups with a water-soluble cation, can be used to manufacture water-based coating compositions.

---

This invention is directed to novel polymeric polyesters which demonstrate outstanding utility in coatings applications. In one aspect this invention is directed to the preparation of a vehicle useful in water based gloss coatings which exhibit exceptional hardness and resistance to hydrolysis. In another aspect this invention is directed to water based coatings themselves. In a particular aspect this invention is directed to water based enamel paints which demonstrate outstanding performance characteristics.

The instant application is related to copending application Ser. No. 401,695, filed Oct. 5, 1964 in the name of the same inventors as the instant application which provides for water based coatings related to those of the instant invention. The instant invention is also related to copending application Ser. No. 424,127, filed Jan. 7, 1965 in the name of K. L. Hoy which provides a novel process for the production of the controlled molecular weight polycyclic polyether polyols used in the noval compositions of this invention.

In recent years, a large portion of the architectural coatings market, e.g., interior and exterior paints, has been captured by water based latex paints. Particularly in the area of flat wall paints. The ease of handling and cleaning, and the non-odoriferous qualities of these water based latex paints has resulted in widespread consumer acceptance. However, there exists a large demand for an enamel coating, particularly, a high gloss enamel, possessing these same advantages which to date these water based latexes have been unable to fulfill. Moreover, the inherent water and chemical sensitivity of the more common alkyd resin-based enamels have fostered the introduction of more expensive coatings such as urethanes and the like for specialty applications. These coatings provide none of the handling advantages of water based latexes yet command premium prices.

By the instant invention, there are provided novel coatings vehicles for water based coatings. There are also provided pigmented water based paints which produce a high gloss enamel surface when dried. These paint compositions prepared in accordance with this invention are characterized by a measurable quality of gloss in excess of 70 units and often in excess of 90 units when measured at a 60° viewing angle on a glossmeter in accordance with Federal Specification TT-P-1416 Method 610.1.

It is accordingly an object of this invention to provide a novel resin vehicle which may be rendered water compatible and thus employed in a broad spectrum of water based coatings. It is a further object of this invention to provide such a novel water compatible resin vehicle to produce coatings compositions which are water reducible but which after application demonstrate superior scrub resistance. It is still a further object of this invention to provide novel water reducible varnishes and paints which can be formulated to produce gloss, semi-gloss or flat finishes.

The novel resin vehicles which are subsequently rendered water compatible in the compositions of this invention are prepared by (1) formation of a polyester of a polycyclic polyether polyol containing an average of at least one hydroxyl group per repeating unit and a long chain unsaturated monocarboxylic fatty acid, and (2) the subsequent adduction to the polyester so formed of an $\alpha,\beta$-unsaturated dicarboxylic acid or anhydride to produce an ester polyol-carboxylic acid adduct having pendant carboxyl or anhydride, i.e. oxydicarbonyl, groups. These adducts may then be rendered "water compatible" by forming hydrophilic salts, e.g., quaternary ammonium salts, at the pendant carboxylic sites of the adduct. Ultimately a broad spectrum of paint compositions may be produced for formulating the water compatible adduct so formed with organic cosolvents, water, pigments, colorants, driers, and the like to produce bake drying or heat drying coatings having a variety of end uses.

The novel ester polyol-carboxylic acid adduct when rendered water compatible may be used to produce novel coatings which demonstrate a degree of hardness and flexibility not heretofore attainable with water-based coatings, and indeed with many oil based alkyd coatings. Moreover, the novel compositions of the instant invention demonstrate excellent resistance to attack by water, solvents and chemicals, and excellent retention of gloss upon exposure to sunlight and weathering.

The novel ester polyol-carboxylic acid adducts of this invention are derived from polycyclic polyether polyols of controlled molecular weight. These polyols are produced by polymerization of polycyclic epoxy monomers containing at least one cyclic vicinal epoxy group and at least one additional hydroxyl equivalent in the form of hydroxyl groups or cyclic vicinal epoxy groups (a cyclic vicinal epoxy group accounting for two hydroxyl equivalents, since by hydration such a cyclic vicinal epoxy group will yield two hydroxyl groups). By the term "cyclic vicinal epoxy group" is meant a vicinal epoxy group whose vicinal carbon atoms form part of a carbocyclic ring structure. Whereas the vicinal epoxy groups in the monomer are bonded directly to the polycyclic ring, it is pointed out and will be hereinafter expanded, that the hydroxyl groups present on monomers useful in making the polycyclic polyether polyols may be bonded to the polycyclic ring through a bivalent linking radical such as an alkylene group or the like.

Accordingly, the monomers employed to produce the polycyclic polyether polyols used in this invention may be considered to be of the classes of monoepoxy polycyclic alcohols, monoepoxy polycyclic polyols, diepoxy polycyclic compounds, diepoxy polycyclic alcohols, and diepoxy polycyclic polyols all of which compounds contain at least one vicinal epoxy group and one additional hydroxyl equivalent as explained above. Preferred monomers contain 1 to 2 cyclic vicinal epoxy groups. The monoepoxy alcohols and polyols are preferred.

These polycyclic epoxy containing monomers when polymerized as hereinafter described produce polycyclic polyether polyols of controllable functionality and chain length. The resulting polymers by virtue of their prominent repeating polycarbocyclic ring units and by virtue of their high carbon to oxygen ratio can be formulated into hard, yet flexible, chemical resistant, coatings which according to this invention are water reducible in nature.

The polycyclic polyether polyols useful in the instant invention have an average polymeric structure which may be depicted by the following block formulae which represents polymers derived respectively from (I) monoepoxy alcohols or polyols, or (II) diepoxides, diepoxy alcohols, or diepoxy polyols.

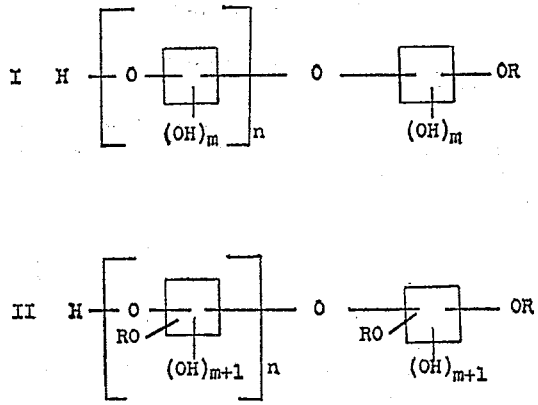

wherein □ represents the entire portion of the monomer molecule excluding hydroxyl groups and the cyclic vicinal epoxy groups, $n$ represents an integer corresponding to the average number of hydroxyl groups in each repeating unit of the polymer which also will correspond to the number of hydroxyl groups in the monomer, $n$ corresponds to an integer designating repeating units of the polymer whose total length is $n+1$, and R represents hydrogen, alkyl, cycloalkyl, hydroxyalkyl, hydroxycycloalkyl, alkoxyalkyl, poly(alkoxy)alkyl or hydroxypoly(alkoxy)-alkyl or the like. Highly preferred polymers are those wherein R is hydrogen.

The coatings of this invention are formulated from the aforesaid polycyclic polyether polyols of controlled molecular weight. Useful polymers may be characterized as liquid to fusible solid polymers having an average minimum of about 8 repeating units. The polycyclic polyether polyols employed in formulating the water reducible coatings of this invention preferably contain an average of from about 8 to about 25 repeating units. Accordingly, referring to the above block formulae, preferred polymers are those wherein $n$ is an average from about 7 to about 24. Polymers having a chain length in this range form coatings films of desirable integrity and high gloss, if desired, also having superior resistance to water and solvent attack. Polymers of high chain length cause formulation problems by virtue of their tendency to gel during the processing steps as hereinafter provided. Optimal chain length, of course, will be dependent upon the monomer size, functionality of the monomer and ultimate polymer polyols employed, and upon such results desired. In general, polymers of higher chain length result in ultimate coatings of increased hardness and brittleness with a decrease in flexibility and impact strength. In most instances, polymeric polyether polyols having from about 10 to about 16 repeating units yield coatings with a desirable balance of properties and hence are highly preferred.

The polycyclic polyether polyols described above are the first component used in forming the polyester portion of the novel ester polyol-carboxylic acid adduct of this invention. Of course, a combination of two or more different polycyclic polyether polyols or a polycyclic polyether polyol which is a copolymer of two polycyclic epoxy monomers, as outlined above, may be employed. These polycyclic polyether polyols are reacted with an unsaturated fatty acid or oil to form a polyester. Subsequently an $\alpha,\beta$-unsaturated dicarboxylic acid or anhydride is adducted to the polyester so produced to yield the desired ester polyol-carboxylic acid adduct useful in the compositions of this invention. The adduction is believed to proceed between the unsaturated fatty portions of the polyester and the $\alpha,\beta$-unsaturation of the acid or anhydride to produce an adduct containing free carboxyl groups of oxydicarbonyl groups.

Therefore, the second component used in preparing the polyester portion of the novel adduct of this invention is an unsaturated fatty acid or oil. Preferred are long chain polyunsaturated monocarboxylic acids. Suitable olefinic fatty acids include those containing up to 22 carbon atoms such as 2-butenoic acid, 3-pentenoic acid, 2-hexenoic acid, 2,4-hexenedioic acid, 4-octenoic acid, 2,4-decadienoic acid, stillingic acid, $\Delta^9$-dodecylenic acid, petroselinic acid, vaccenic acid, linoleic acid, palmitoleic acid, linolenic acid, eleostearic acid, punicic acid, licanic acid, arachidonic acid, cetoleic acid and the like. It is advantageous for purposes of economy to employ mixtures of acids, particularly those derived from natural sources such as dehydrated castor oil, cottonseed oil, linseed oil, oiticaca oil, perilla oil, olive oil, safflower oil, sardine oil, soybean oil, tall oil, tung oil (Chinawood oil), and the like. In general, acids or oils having an iodine number in excess of about 100 are preferred.

Mixtures of acids may of course be employed. In addition, if desired, long chain saturated fatty acids may be employed in small amounts, e.g., valeric acid, caproic acid, myristic acid, capric acid, palmitic acid, stearic acid, lauric acid (coconut oil acids) and the like. The use of such acids, however, will deplete the number of sites at which the adduction of the $\alpha,\beta$-unsaturated acid can occur. Regulation of this can become a factor in regulating the water compatibility of the ultimate compositions, as will become obvious to the skilled artisan following a complete consideration of the teachings herein.

Also the use of short chain $\alpha,\beta$-unsaturated acids as the unsaturated fatty acid component is not preferred since these compounds tend to autopolymerize. Such compounds as acrylic acid, methacrylic acid, tigelic acid, and the like accordingly are not preferred as the unsaturated fatty acid in compositions of this invention.

It is pointed out that the esterification of the polycyclic polyether polyol may be effected employing an olefinic fatty acid or the corresponding oil or triglyceride. Since the esterification is between an acid and alcohol, water of esterification may be produced. It is accordingly pointed out that use of an oil rather than the acid results in an ester interchange and effects the desired esterification without producing water of esterification. However, there is no disadvantage to such water formation since it will not adversely affect the composition, and actually since the esterification is carried out at moderately elevated temperatures, this water is usually vaporized as it is formed.

In its broad aspect, the polyesters are prepared from the hereinbefore described reactants, by techniques which are not unlike those employed in alkyd resin production and are well known to the art. In a suitable procedure, the polycyclic polyether polyol and the unsaturated monocarboxylic acid or oil are charged to a reaction vessel along with a catalyst, if desired, and a high boiling organic solvent, the admixture is heated at a temperature and for a period of time sufficient for the removal of water of esterification and completion of the reaction.

It is preferred in producing the polyesters used to form the novel adducts of this invention to esterify all or substantially all of the hydroxyl groups of the polycyclic polyether polyol. The reason for this will become apparent upon discussion of the adduction of an $\alpha,\beta$-unsaturated dicarboxylic acid or anhydride to the polyester which will be elaborated upon hereinafter. Accordingly, the total carboxyl content of the monocarboxylic fatty acid or oil should be preferably substantially stoichiometrically equivalent to the total hydroxyl content of the polycyclic hydroxy compound. Generally, at least about 0.9 equivalent of carboxyl groups per hydroxyl equivalent is employed. It is suitable to employ from about 0.9 to about 1.25 or preferably from 1.0 to 1.20 carboxyl equivalents per hydroxyl equivalent in making the polyester, though additional carboxyl may be added to the ester as hereinafter provided. The total charge of unsaturated monocarboxylic acid or oil can be added at once. However, care should be taken to assure substantially complete esterification of the hydroxyl groups before proceeding with the following steps in the formulation of the novel water reducible coatings.

In a highly preferred embodiment of this invention useful coating compositions which surpass many of the commercially available alkyd resins, are obtained by a careful control of the concentration of hydrolyzable and/or water sensitive groups in the polyester portion of the coating composition. It has been found that the frequency of these groups is an important factor in the overall water and alkali-resistance of the polymeric product. While the sensitivity caused by hydroxyl, ethers, and acids to water is greater than esters, only the ester group is hydrolyzable with alkali and hence the net effect of all appear to be about the same regardless of type when the overall chemical properties of the coating are considered. Thus, the addition of excess monocarboxylic acid or oil, although perhaps unesterified, does effectively raise the carboxyl content and correspondingly increase the water sensitivity of the polyester, and ultimately of the coating produced therefrom. However, such excess unsaturated monocarboxyl acid will increase the number of unsaturated sites at which the adduction with the $\alpha,\beta$-dicarboxylic acid or anhydride can occur. Ultimately since the free carboxyl groups of the novel ester polyol-carboxylic acid provide the sites for introduction of hydrophilic to render the adduct water compatible, an excess of unsaturated acid as provided above may be desirable.

The excellent stability and chemical and water resistance of the compositions of the instant invention appears in part to be due to a protective steric hindrance of the ester groups caused by the bulky polycarbocyclic ring of the polycyclic polyether polyols. In addition the polycarbocyclic rings of the polycyclic polyether polyols are believed to contribute rigidity and hardness to the coating prepared therefrom. Nevertheless, an excessive concentration of ester, hydroxyl, acid or ether groups in the polyester results in early failure of the coating when exposed to aqueous, particularly alkaline conditions. The percent of oxygen has often been employed as a criteria in measuring the concentration of these groups. It has been found that polyester resins in general, e.g., alkyds and the like, having an overall oxygen content (including oxygen of excess monocarboxylic unsaturated fatty acid) less than 20 percent and more preferably 18 percent, have good chemical and water resistance. Since the polyesters utilized in the coatings of this invention are derived from polycyclic polyester polyols, suitable polyesters for coatings may be prepared having an overall oxygen content of less than 10 percent. This enables preparation of coatings in accordance with the instant invetion which demonstrate a very high degree of water, alkali and solvent resistance. Generally the polyesters produced in accordance with this invention from polycyclic polyether polyols contain from about 8 to about 12 percent by weight oxygen. This oxygen fraction does not include oxygen absorbed from the air during the cure of the coatings. In some instances this may be as high as an additional 10 to 12 percent. Accordingly, insofar as the polyesters of the instant invention are concerned, it is preferred to maintain overall oxygen content below 18 percent preferably below 15 percent.

The production of the polyester may be produced by heating the polycyclic polyether polyol with the unsaturated monocarboxylic acid or oil in an inert solvent vehicle. If desired a catalyst may be employed for this reaction. Catalysts which have been found suitable to produce the polyester include among others the tetraalkyl titanates, e.g., tetraethyl titanate, tetraisopropyl titanate, tetrabutyl titanate, and the like, also are contemplated.

Basic catalysts also can be employed. Illustrative basic catalysts include for instance, alkali metal catalysts, e.g., sodium hydroxide, potassium hydroxide, lithium acetate calcium naphthenate and the like; the amines, e.g., alphamethylbenzyldimethylamine, dimethylethylamine, triethylamine, tripropylamine, trimethylammonium hydroxide, and the like.

The catalyst is employed in small catalytic amounts ranging from about 0.01 and lower, to about 10.0, and higher, weight percent, based on the total weight of reactants.

Suitable vehicles in which the esterification reaction can be conducted include normally liquid organic compounds in which the reactants are at least partially soluble and which are inert to the components of the formulation. Typical solvents include, for instance, the aromatic hydrocarbons, e.g., benzene, toluene, xylene, ethylbenzene, and the like; the saturated aliphatic and cycloaliphatic hydrocarbons, e.g., hexane, heptane, cyclopentane, cyclohexane, lower alkyl substiuted-cyclohexane, and the like; the oxygenated organic compounds, e.g., acetone, methyl ethyl ketone, methyl isobutyl ketone, cyclohexanone, tetrahydrofuran, dioxane, and the like. The aromatic hydrocarbons are preferred.

The esterification reaction can be conducted at an elevated temperature, for example, a temperature at least about 75° C. and even lower. A suitable temperature range is from about 150° C. to about 300° C., and higher, and preferably, from about 150° C. to about 250° C. The reaction period can vary from several minutes to several days depending, of course, on factors such as the reaction temperature, the concentrations and reactivities of the reactants, the presence or absence of a catalyst, and the like. In general, a reaction period of from about 0.5 to about 24 hours is suitable. Water resulting from the esterification reaction will be vaporized if the reaction is conducted at temperatures over 100° C. or can be removed by methods well known to the art.

Degree of esterification may be effectively measured by determining the acid number of the polyester. Acid number is defined as the number of milligrams of potassium hydroxide required to neutralize the free acid in a gram of the polyester. Upon completion of the reaction of the polyesters useful in the ultimate novel compositions of this invention possess an acid number less than 20, preferably less than 18. An acid number below about 14 indicates virtually complete esterification and polyesters having acid numbers in this range are highly desirable. Of course the minimal achievable acid number will depend upon the original overall COOH/OH ratio in the initial charge as well as upon the reactivity of the reactants. To test the progress of the reaction, acid numbers of the reaction mixture may be taken periodically, and the heating should be maintained until the acid number has reached a value less than 20 and preferably until the acid number readings have reached a constant minimum.

The esterification is preferably conducted in the presence of an non-oxidizing atmosphere. Oxidation of the reactants by air at the elevated temperatures causes formation of color bodies in the polyester and can lead to imminent gelation. Accordingly the esterification is preferably conducted in a closed container under a nitrogen atmosphere or in an open kettle blanketed with a heavy non-oxidizing gas such as carbon dioxide.

If desired, the resulting esterified product can be recovered from the inert normally liquid organic solvent (if one is employed) by various well known expediences. The product can also be recovered from solution by heating to drive off the organic solvent.

The novel ester polyol-carboxylic acid adducts are then prepared by the adduction to the polyester or to the polyester admixed with excess monocarboxylic acid, of a polycarboxylic acid in such a manner as to preserve the carboxyl groups of the said polycarboxylic acid unreacted. It is preferred to use polycarboxylic acid which readily will enter other reactions such as vinyl polymerization, "ene" polymerization, Diels Alder addition or the like. Suitably, therefore, the adduction is effected with a polycarboxylic acid or anhydride which is ethylenically unsaturated in a position which is alpha-beta to any of the carbonyl carbon atoms since these compounds have active double bonds. α,β-Unsaturated polycarboxylic compounds which are useful in preparing the ester polyol-carboxylic acid adducts include the following acids and their anhydrides: maleic acid, maleic anhydride, fumaric acid, itaconic acid, itaconic anhydride, glutaconic acid, citraconic acid, citraconic anhydride, mesaconic acid, the alkylidene malonic acids such as ethylidenemalonic acid, propylidene malonic acid, butylidene malonic acid and the like, α-hydromuconic acid, the dialkyl maleic acids such as dimethyl maleic acid (pyrocinchonic acid), diethyl maleic acid (xeronic acid), dipropyl maleic acid, dibutyl maleic acid and the like, 1,6-hex-2-enedioic acid, 1,6-hexa-2,4-dienedioic acid, and the like. Preferred are acyclic dicarboxylic acids and anhydrides containing up to 10 carbon atoms. Hereinafter, when reference is made to these α,β-ethylenically unsaturated acids used in the adduction, this will be deemed to include the corresponding anhydride.

The adduction of the α,β-unsaturated acid is achieved by adding the α,β-unsaturated acid to the polyester containing the excess fatty acid, if such excess is present. The adduction desirably takes place through the α,β-unsaturated double bond of the acid leaving the carboxy groups of the acid or anhydride unreacted. Accordingly it can be seen why it was preferable to react all the hydroxyl groups and vicinal epoxy groups of the polycyclic hydroxy compound, since unreacted hydroxyl groups will react with the carboxyl groups of the α,β-unsaturated dicarboxylic acid added during the instant adduction.

It is desirable to add sufficient α,β-unsaturated dicarboxylic acid to raise the acid number of the adduct to at least about 35. Suitable ester polyol-carboxylic adducts have acid numbers in the range of from about 40 to about 120. Generally these acid numbers in this range can be achieved by adding up to about 50 percent on an equivalent basis of the α,β-unsaturated dicarboxylic acid based upon the hydroxyl equivalency of the original polycyclic polyether polyol. However, acid number range is the more important criteria in preparing the adduct.

It is apparent that the addition of an overly excessive amount of dicarboxylic acid will adversely effect the ultimate coating compositions by virtue of the high proportions of oxygen present in the dicarboxylic acid. In addition it should be mentioned that addition of maleic acid to an already high molecular weight polyester can at times cause gelation of the ester polyol-carboxylic acid adduct. It is in the instance where the polyester is already of a high molecular weight and consequently gelation resulting from crosslinking the α,β-unsaturated dicarboxylic acid is likely, that an excess of monocarboxylic acid is desirable. The presence of excess monocarboxylic fatty acid permits addition of sufficient α,β-unsaturated dicarboxylic acid to bring the acid number above the minimal value of about 35 without causing gelation.

The adduction reaction is conducted at a temperature of about 175 to 250° C. by simply mixing the reactants. The addition of iodine in small catalytic amounts preferably about .005 to about .5 percent by weight based on both the polyester and the α,β-unsaturated dicarboxylic acid facilitates the adduction of the α,β-unsaturated dicarboxylic acid by vinyl polymerization, "ene" polymerization, Diels Alder addition, and the like. The addition of iodine may conveniently be accomplished by first dissolving the iodine in an inert solvent such as xylene.

Often the addition of the α,β-unsaturated dicarboxylic acid to the polyester causes development of considerable color in the adduct. It has been found that the development of color can be inhibited by addition of a phosphite stabilizer to the reaction mixture. Suitable phosphite stabilizers include triisooctyl phosphite, tributyl phosphite, tripropylene glycol phosphite, diphenyl isodecyl phosphite, diphenyl pentaerythritol diphosphite and the like. These phosphite stabilizers are usually added in small amounts sufficient to inhibit the development of color. Satisfactory color inhibition has been obtained by use of up to about 1 percent of the phosphite stabilizer generally from about 0.01 to about 1 percent based on the weight of both the polyester and the α,β-unsaturated dicarboxylic acid.

Novel water compatible adducts are then prepared from the ester polyol-carboxylic acid adducts having pendant carboxyl groups by modifying these pendant carboxyl groups with a water soluble cation to create a hydrophilic carboxylic acid salt. Thus, it is necessary in the adduction step to preserve as many of the carboxyl groups of the α,β-unsaturated dicarboxylic acid in the unreacted state, since these serve as the sites for introduction of hydrophiles in this "water solubilization" step.

One method of "water solubilization," i.e., of rendering the adducts water compatible, is by creating the quaternary ammonium salts by the reaction of the pendant carboxyl groups with ammonia or an amine under aqueous conditions. These quaternary salts furnish a multiplicity of hydrophilic sites in the polymer itself to render the ester polyol-carboxylic adduct water compatible if not water soluble. By water compatibility is meant that the adduct, although not miscible with water in all proportions, can be solubilized in a mixture of water and an organic co-solvent to provide a solution containing approximately 40 percent resin solids, and may thereafter be diluted down with water to a solution containing 5 percent resin solids.

The quaternary ammonium salt of the ester polyol-carboxylic acid adduct is produced by reacting the free carboxyl groups of the adduct with an aqueous solution of a compound such as ammonia or an amine under aqueous conditions. Following the water solubilization with ammonia or amine the desired ester polyol-carboxylic acid adduct would therefore have pendant hydrophilic quaternary groups of the structure:

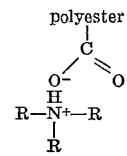

wherein each R represents hydrogen, an organic radical or in the case of cyclic amines two R substituents taken together may form an alkylene or heteroalkylene chain.

Suitable amines are water soluble primary, secondary, and tertiary amines which will produce the desired hydrophilic quaternary ammonium group. The amines may be otherwise substituted so long as the substituents do not adversely react with any of the components in the system. Accordingly, alkanolamines, dialkanolamines and the like are suitable since they are for the most part water soluble and since the hydroxyl substituent will not tend to form an ester with the free carboxyl groups in the aqueous medium.

The hydrophilic quaternary ammonium groups lend water compatibility to the ester polyol-carboxylic acid adducts of this invention. However, when the ultimate coating composition is applied, the amine evaporates during the drying process thus leaving a water insoluble resin film as the coating. Thus it is obvious that for an air drying coating the amines to be employed must have vapor pressures sufficiently high to permit drying of the coating within a reasonable period of time. For such air drying coatings desirable amines are those which possess a boiling point of less than about 180° C. at 760 millimeters of mercury pressure. Highly suitable are amines boiling below about 180° C. Of course, if a heat curable coating is desired, obviously the vapor pressure of the amine would be immaterial and it would be necessary only to employ an amine having a boiling point lower than the boiling point or the char point of the resin which forms the coating.

Compounds which are suitable for reaction with the carboxyl groups to produce a hydrophilic quaternary ammonium group include ammonia, amines such as the primary, secondary and tertiary amines, including alkanolamines, polyamines such as diamines and triamines, cyclic amines such as the morpholines, piperazines, and the like, which are water soluble. In the case where employed for air drying coatings, which will produce a coating which will dry within a reasonable period of time, an amine having a boiling point below about 180° C. is preferred.

Typical amines are primary alkyl amines such as ethylamine, diethyl amine, propyl amine, isopropyl amine, butyl amine, amyl amine, methylbutyl amine, dimethyl amine, and trimethyl amine (these latter two compounds are difficult to handle being gases), dimethylamino propylamine, diethylamino propylamine, ethylene diamine, diethylene triamine, propylene diamine, 1,3-diaminopropane, N,N,N',N'-tetramethyl butanediamine, monoethanolamine, N-methylethanolamine, N-ethylethanolamine, N,N-dimethylethanolamine, N,N-diethylethanolamine, N-aminoethylethanolamine, monoisopropanolamine, morpholine, 2,6-dimethylmorpholine, N-methylmorpholine, N-ethylmorpholine, piperazine, N-methylpiperazine, N-hydroxyethyl piperazine, N-aminoethyl piperazine. A wide variety of other amines may be employed including mixtures of amines if they are water soluble and will form the quaternary ammonium salt with a carboxyl group in aqueous solution. However, in the formulation of a marketable and commercially desirable product, qualities such as the toxicity and the odoriferousness of the amine are of primary importance. For example an amine such as cadaverine (1,5-pentanediamine) would be satisfactory from a chemical standpoint, but if incorporated in a coating would create a highly undesirable odor as the coating dries.

It will be obvious that upon obtaining the ester polyol-carboxylic acid adduct having pendant carboxyl groups, that these carboxyl groups could be rendered hydrophilic by a method other than by creation of the quaternary ammonium salt, though this method is here preferred. For example, reaction of the carboxyl groups with an alkali metal hydroxide will result in the formation of the alkali metal salt, which is a hydrophile. The alkali metal salts are extremely basic and would raise the pH of the ester polyol-carboxylic acid adduct solution considerably. Since a highly alkaline solution causes additional hydrolytic attack upon the ester groups of the ester polyol-carboxylic acid adduct, the introduction of such a hydrophile would itself tend to degrade the basic resin portion of the coating. Minor amounts of an alkali metal hydroxide preferably less than 25 percent of the stoichiometric equivalency of carboxyl groups of the adduct may be tolerated. At times a small amount of alkali metal hydroxide, e.g., sodium or potassium hydroxide, is advantageous in promoting the quaternary reaction.

To obtain optimum solubility of the ester polyolcarboxylic acid adduct there is employed sufficient amine, (and alkali metal hydroxide if employed) to react with at least all the free carboxyl groups in the polymer. Therefore, preferably there is added an amount of the amine and hydroxide stoichiometrically equivalent to the amount of $\alpha,\beta$-unsaturated dicarboxylic acid added to polyester in the adduction step. Since the purpose of the adduction is to create sites which may be rendered hydrophilic, the use of less than the stoichiometric equivalence of amine is not desirable. Generally an excess of amine is preferred and preferably up to 50 percent excess based on the weight of the stoichiometric requirement of amine is employed. Preferably about 10 percent by weight excess based on the weight of the stoichiometric requirement of amine is employed. It has been found that addition of excess amine improves the water compatibility of the ester polyol-carboxylic acid adduct. But concurrently the presence of excess amine tends to raise the pH, increasing the hydrolytic attack upon the ester groups of the polyester, and also tends to result in an ultimate coating having a longer drying time.

The addition of the amine is accomplished by simply adding an aqueous solution containing the amine and stirring into the ester polyol-carboxylic acid adduct. Since the adduction step is commonly carried out at temperatures above 100° C., it is obvious that it would be most desirable to effect the addition of the aqueous amine solution following a cooling of the ester polyol-carboxylic acid adduct to a temperature below 100° C., so as to prevent the vaporization of the water of the solution. Aside from this consideration, the amine addition may be effected over a broad range of temperatures from ambient temperatures up to 100° C.

The amine is preferably added as a solute in sufficient water to assure the formation of the quaternary ammonium salt of the free carboxyl groups of the adduct rather than the amide. Generally, at least an equimolar amount of water based on the amine is employed. More commonly, for facility in formulation, the amine is added as about a 50 percent solution in water.

The addition of the amine renders the ester polyolcarboxylic acid adduct compatible with water and usually the water compatible adduct will form a solution with the relatively small amount of water added with the amine. Despite the formation of hydrophiles, e.g., quaternary ammonium groups, the water-compatible ester polyol-carboxylic acid adduct hereinafter called the "neutralized resin," is not miscible with water in all proportions. However, in formulating a water based coating it is necessary to provide a resin solution of the neutralized resin which may be diluted with water down to application viscosity, and more desirably to provide a resin solution which is capable of even extreme dilution with water, down to a solution containing 5 percent or less of resin solids, i.e., the neutralized resin. The extreme dilutability facilitates formulation of a wide variety of coatings and also enables brush cleaning with water alone following application of the coating. To obtain such water dilutable solutions, it is necessary to employ an organic cosolvent to increase the solubility of the neutralized resin in water.

In preparing a coating, the organic cosolvent is generally added to the neutralized resin (containing the water added during the amine addition) in sufficient amount to permit further dilution with water alone to application viscosity without causing the neutralized resin to come out of solution. More preferably enough cosolvent should be added to permit dilution to a solution containing no more than 5 weight percent neutralized resin, without causing the neutralized resin to come out of solution. Accordingly, it is convenient to provide a coatings vehicle already containing the organic cosolvent, which vehicle may be subsequently modified with pigments, colorants, and driers, and may be diluted to the desired application viscosity with water alone without danger of precipitating the neutralized resin from solution.

Useful organic cosolvents are identified by high solubilities for both water and the neutralized resin. The necessary properties of suitable organic solvents may be readily ascertained following a consideration of the ternary miscibility data of the neutralized resin-solvent-water system. In general, upon addition of the aqueous amine solution to the ester polyol-carboxylic acid adduct there is obtained a solution, or a mixture, containing a predominant amount of neutralized resin and a minor amount of water. The organic cosolvent is added to this system in an amount sufficient to produce a single liquid phase comprising the neutralized resin, the cosolvent and the water, and moreover, in sufficient amount to maintain this single liquid phase upon subsequent dilution of the neutralized resin solution with water to the concentration desired for application. As hereinbefore pointed out it is highly desirable to add sufficient cosolvent as to enable even extreme dilution with water, down to 5 percent neutralized resin in solution. The amount of cosolvent which must be added to the neutralized resin will depend upon the particular ternary system. A prime consideration is the water compatibility of the neutralized resin, i.e., the number of hydrophilic moieties introduced into the ester polyol-carboxylic acid adduct by addition of the amine. Generally, the addition of from about 0.15 to about 2 parts by weight of cosolvent based upon the weight of the neutralized resin is sufficient to enable subsequent dilution with water down to a concentration of 5 percent neutralized resin. More preferably, admirably suitable coatings contain from 0.25 to 1 part by weight of cosolvent based on the weight of the neutralized resin. However, the amount of cosolvent to be added in each particular instance may be dictated by additional factors other than solubility. For example, if drying characteristics or viscosity of the coatings are of prime importance, the choice and amount of cosolvent to be employed may be accommodated to achieve this objective. Mixtures of fast evaporating and slow evaporating cosolvents are useful to provide coatings which set in a fairly short time but do not dry completely so quickly as to afford an unduly short lap time during which retouching can be effected without marring the uniformity and color of the coating finish. Such retarding of rapid dry also affords improved brush cleansibility. In such formulations the slow evaporating cosolvent, called a retarder, is usually employed in amounts ranging from about 0.05 to about 0.5 part by weight based upon the weight of the neutralized resin. It is pointed out that an increase of cosolvent, in excess of that needed to allow the desired degree of dilutability of the neutralized resin with water, will result in a decrease in viscosity of the ultimate coating.

Typical organic cosolvents which may be employed demonstrate a high solubility in water, over about 90 percent, and a high solubility for the neutralized resin. In all instances, however, the ternary miscibility characteristics of the solvent on the neutralized resin-solvent-water system will permit dilution to a solution of 5 percent neutralized resin or less while maintaining a single continuous phase. Suitable cosolvents include the alkylene glycol monoalkyl ethers such as methoxyethanol, ethoxyethanol, propoxyethanol, butoxyethanol, methoxypropanol, ethoxypropanol, propoxypropanol, butoxypropanol, the methyl ethers of butylene glycol and of hexylene glycol; the dialkyl ethers of alkylene glycol such as dimethoxyethane, the alkyl and dialkyl ethers of diethylene glycol such as methyl, ethyl, propyl and butyl ethers of diethylene glycol, e.g., butyl carbitol, and the dimethyl diethyl ethers of diethylene glycol; the cyclic ethers such as tetrahydrofuran and dioxane; diacetone alcohol and the like. The alkylene glycols, such as butylene glycol, are suitable solubility-wise but by virtue of their high boiling points would result in air-drying coatings having an extended drying time, though this would not preclude their use in bake-dry coatings. These high boiling compounds can be used in small amounts as retarders with other cosolvents. Of course in formulating an ultimate composition, physical qualities such as odor, toxicity, and flammability are of prime importance, and choice of the cosolvent will often be dictated by such characteristics. It will be obvious that a wide variety of solvents which increase the solubility of the neutralized resin in water can be used in formulating coatings within the scope of this invention. The water compatibility of the neutralized resins of this invention will enable their use with a broad range of solvents to obtain fast or slow drying industrial or consumer coatings. Usually for air drying coatings it is desirable to utilize a primary cosolvent or mixture of cosolvents boiling at a temperature of less than about 200° C. As pointed out above the primary cosolvents may be used in conjunction with a high boiling retarder, e.g., a solvent boiling at a temperature up to 250° C. or higher, to obtain specific drying characteristics.

The neutralized resin vehicles provided herein may be employed in a broad spectrum of coatings varying from clear varnishes and high gloss enamels to flat interior wall paints. The vehicles may be used as the sole film former in the coating compositions or in combination with vinyl type latexes, if desired. Formulation of paints from the neutralized resin vehicles may be conveniently accomplished in standard paint manufacturing equipment ordinarily employed in the industry for oil or water based paint formulations. The pigment dispersion in the resin solution may be accomplished by means of a roll mill, a ball mill, a sand mill or the like. Ball mill dispersion often results in excessive foamings and hence is not preferred.

The paint compositions formulated in accordance with this invention utilize the novel neutralized resin as the primary non-volatile binder, or film former, of the coating. Although, as pointed out, the amine portion of the neutralized resin will slowly evaporate from the coating during the drying process, the neutralized resin is deemed a non-volatile component. The total non-volatile volume of a paint composition is the sum of the pigment or extender and the non-volatile binder, which, as hereinbefore pointed out may comprise the novel neutralized resin alone or in combination with a vinyl type latex or other binder. Suitable latexes are dispersions of plastic semi-solids such as butadiene-styrene copolymer, polystyrene in both pre-plasticized and post-plasticized systems, polyvinyl acetate and the like. Water and the cosolvent form the main volatile components of the paint composition. In addition to the volatile and non-volatile components, the novel ultimate paint compositions of this invention also contain a metallic drier.

Accordingly, the novel neutralized resins are employed in paint compositions using various components otherwise known in the art. Formulation methods similar to those of the art may also be employed. The neutralized resin may merely be formulated as have been other binders in paint manufacture. In this regard the paints utilizing neutralized resin may be prepared using other well known paint ingredients such as emulsifying agents, dyes, colorants, antifoaming agents and the like, according to the ultimate properties desired and the properties of the paint which are encountered.

The neutralized resins may be employed in conjunction with a wide variety of opacifying and extending pigments to produce a wide variety of novel paint formulations. It is preferred, in formulating paints from the neutralized resin solution to employ pigments which are not acid reactive. Such pigments, e.g., zinc oxide, calcium sulfate and the like, tend to crosslink the resin and thicken and ultimately gel the paint. Eminently suitable as opacifying a pigment is titanium dioxide, ferric oxide, and carbon black, and as extending pigments, silica, talc, clay and the like. These pigments may be used in conjunction with colorants such as phthalocyanine green to produce variously colored paints.

As hereinbefore pointed out the compositions of this invention may be employed in high gloss enamels, semi-glass paints, and interior flat paints. The degree of light reflection of the ultimate paint will be determined primarily by the amount of pigment employed. Pigment volume concentration based on the overall volume of non-volatile vehicle varies from as low as about 10 to about 30 percent for high gloss enamel paints to as high as about 45 to about 65 percent for flat interior wall paints. Semi-gloss finishes may be obtained by using intermediate pigment volume concentrations of from about 30 to about 45 percent. The light reflectance properties however are largely dependent upon the particular pigment employed and the resin vehicle, as will be appreciated by those skilled in the art.

Metallic driers are generally employed in the novel paint compositions of this invention in small amounts sufficient to impart desired drying characteristics. Suitable driers are metallic salts of carboxylic acids, and are known in the art. Typical driers include cobalt, manganese and zirconium salts such as cobalt naphthenate, cobalt linolate, manganese tallate, zirconium octoate, cobalt octoate and the like. For obvious reasons, preferred driers are water soluble or water dispersible. Driers are employed in small amounts depending upon the resin vehicle itself desired drying characteristics. Generally from about 0.005 to about 1 percent by weight of the metal of the drier based on the weight of the neutralized resin composition is employed.

As hereinbefore discussed the neutralized resin solutions of this invention may be diluted with water alone to application viscosity. For example the neutralized resin may be pigmented on a roll mill using only a portion of the neutralized resin to disperse the pigment, and subsequently adding neutralized resin and water to achieve the finished paint composition. The viscosities of the finished paint compositions can be varied depending upon intended use, but usually range from about 50 to 90 Krebs units. It should be noted that if formulating of the final composition is carried out by diluting a pigmented neutralized resin solution, that a parallel formulation without pigment should be examined for clarity to assure complete solubility of the neutralized resin. In this regard, often provision for a small increase in the amount of cosolvent in the formulation recipe will generally restore clarity to the solution.

The polycyclic polyether polyols are produced by the polymerization of a polycyclic epoxy alcohol or polyol, or a polycyclic polyepoxy alcohol or polyol in the continual presence of a non-epoxy hydroxyl containing chain length modifier. This polymerization process is the subject of the aforesaid application Ser. No. 424,127, which is hereby incorporated into this application by reference. The polycyclic polyether polyols to be employed in the water reducible coatings of this invention are preferably those derived from polycyclic monoepoxy alcohols and polyols. Accordingly, the preparation of these polycyclic polyether polyols will be set forth hereinafter with regard to the polycyclic polyether polyols derived from such monoepoxy alcohols and polyols.

Suitable monomers which may be employed to obtain the polycyclic polyether polyols used in the water reducible coatings of this invention contain one cyclic vicinal epoxy group and at least one additional hydroxyl equivalent in the form of hydroxyl groups. By the term "cyclic vicinal epoxy group" is meant a vicinal epoxy group whose vicinal carbon atoms form part of a carbocyclic ring structure. The monomers useful in preparing the aforesaid polycyclic polyether polyols for the water reducible coatings of this invention are accordingly characterized by (1) a polycarbocyclic ring structure, preferably saturated, comprising at least one integral bicyclo [2.2.1]-heptanoid ring structure alone or as part of a fused polycarbocyclic ring system having up to 6 carbocycles, preferably up to 4 carbocycles, each carbocycle preferably containing from 5 to 6 carbon atoms, and (2) at least one cyclic vicinal epoxy group and at least one additional hydroxyl equivalent in the form of hydroxyl groups or cyclic vicinal epoxy groups, said hydroxyl groups being bonded to the polycarbocyclic ring directly or through a bivalent organic radical. Accordingly, these polycyclic epoxy monomers will minimally contain one vicinal epoxy group together with one hydroxyl group. The monomers may preferably contain up to about eight total hydroxyl equivalents including the single vicinal epoxy group always present in the monomers. The hydroxyl groups are bonded to the polycyclic ring directly or through a bivalent organic radical preferably an alkylene, alkyleneoxy, or poly(alkyleneoxy) group. These bivalent radicals can contain a plurality of hydroxyl groups, preferably up to six. The bivalent alkylene moieties preferably contain from 1 to about 6 carbon atoms. In the particular case of the polyalkyleneoxy radicals, those preferably are identified by repeating alkyleneoxy units containing from two to four carbon atoms such as, for example, ethylene, 1,2-propylene, 1,3-propylene, 1,2-butylene, 2,3-butylene, 1,3-butylene, and 1,4-butylene and the like. The hydroxypolyalkyleneoxy substituents are preferably relatively short chain groups, i.e., containing up to about 5 repeating alkyleneoxy units.

However, since it appears that the coatings derive their hardness, at least on part from the rigid polycarbocyclic of the polycyclic polyether polyols, it is preferred to utilize monomers wherein the hydroxyl groups are bonded directly to a polycarbocyclic ring as provided herein. The existence of hydroxyl groups on alkylene, poly(oxyalkylene), or like substituents results in a polymer having these linear sections in the polycyclic polyether polyol backbone. This tends to dilute the effect of the cyclic rings and diminishes hardness in the ultimate coating.

The preferred epoxy monomers useful in preparing the polycyclic polyether polyols are characterized by from 2 to 4 carbocycles, having 5 to 6 carbon atoms in each carbocycle, and are identified by a bicyclo[2.2.1]heptanoid ring alone or as part of a fused polycarbocyclic structure, such as for example, the following ring structures:

bicyclo[2.2.1]heptanoid

tricyclo[5.2.1.0$^{2,6}$]decanoid

tricyclo[6.2.1.0$^{2,7}$]undecanoid

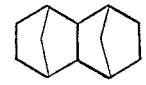

tetracyclo[6.2.1.1$^{3,6}$.0$^{2,7}$]dodecanoid

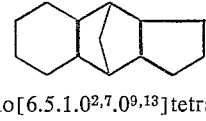

tetracyclo[6.5.1.0$^{2,7}$.0$^{9,13}$]tetradecanoid

tetracyclo[6.6.1.0$^{2,7}$.0$^{9,14}$]pentadecanoid and the like. Highly preferred are those compounds having ring structures containing from 3 to 4 carbocycles.

It is pointed out that the vicinal epoxy substitution and the hydroxyl substitution of polycyclic epoxy monomers used in producing the polycyclic polyether polyols takes place at non-bridgehead positions. Thus, for example, the 1 and 4 positions of a bicyclo[2.2.1]heptanoid ring, would not be those substituted by either hydroxyl or vicinal epoxy groups, likewise, in a tricyclo[5.2.1.0$^{2,6}$] decanoid, the 1,2,6, and 7 positions, being bridgehead positions would not carry the hydroxyl or vicinal epoxy substitutions. It is understood that these fused polycyclic epoxy monomers can also be further substituted, preferably with none other than alkyl groups of 1 to 6 carbon atoms, such substitution being preferably effected at other than bridgehead positions on the polycarbocyclic ring. In addition, the above polycyclic epoxy monomers are preferably not substituted on the methano carbon atom with other than hydrogen substitution.

Specific compounds which may be used in the instant invention as the said polycyclic epoxy monomers include the following. For example specific compounds having the characteristic bicyclo[2.2.1]heptanoid ring are:

3-oxatricyclo[3.2.1]octan-6-ol,
6-ethyl-3-oxatricyclo[3.2.1]octan-7-ol,
7-oxapropyl-3-oxatricyclo[3.2.1]octan-8-ol,
3-oxatricyclo[3.2.1]octane-6,7-diol,
3-oxatricyclo[3.2.1]octane-6,8-diol,
epoxybicyclo[2.2.1]heptyl alkanols such as
3-oxatricyclo[3.2.1]octyl-6-butanol,
3-oxatricyclo[3.2.1]octyl-6-methanol,
6-hydroxymethyl-3-oxatricyclo[3.2.1]octan-5-ol.

The oxypolyalkyleneoxyalkanols and oxyalkanols having the bicyclo[2.2.1]heptyl structure such as:

3-oxatricyclo[3.2.1]oct-6-oxyethanol,
5-isopropyl-3-oxatricyclo[3.2.1]oct-6-oxytriethyleneoxyethanol and the like.

Specific examples of suitable compounds having characteristic tricyclic structures such as the tricyclo-[5.2.1.0$^{2,6}$]decanoid and the tricyclo[6.2.1.0$^{2,7}$]undecanoid ring are the following:

5-oxatetracyclo[6.2.1.0$^{2,7}$.0$^{3,5}$]undecan-9-ol,
11-methyl-5-oxatetracyclo[7.2.1.0$^{2,8}$.0$^{4,6}$]dodecan-10-ol,
5-oxatetracyclo[6.2.1.0$^{2,7}$.0$^{4,6}$]undecane-9,10-diol,
5-oxatetracyclo[6.2.1.0$^{2,7}$.0$^{4,6}$]undecan-10-ol,
5-oxatetracyclo[7.2.1.0$^{2,8}$.0$^{4,6}$]dodec-9-oxyethanol,
5-oxatetracyclo[6.2.1.0$^{2,7}$.0$^{4,6}$]undec-9-oxy-n-pentanol,
5-oxatetracyclo[7.2.1.0$^{2,8}$.0$^{4,6}$]dodec-9-oxy-n-butanol,
5-oxatetracyclo[6.2.1.0$^{2,7}$.0$^{4,6}$]undec-9-oxy-n-butanol,
5-oxatetracyclo[7.2.1.0$^{2,7}$.0$^{4,6}$]undec-9-oxy-t-butanol,
5-oxatetracyclo[6.2.1.0$^{2,7}$.0$^{4,6}$]undec-9-oxy-n-hexanol,
5-oxatetracyclo[6.2.1.0$^{2,7}$.0$^{4,6}$]undec-9-oxy-n-octanol,
5-oxatetracyclo[7.2.1.0$^{2,8}$.0$^{4,6}$]dodec-9-oxy-n-decanol, and the like.

Illustrative examples of the 5-oxatetracyclo[6.2.1.0$^{2,7}$.0$^{4,6}$]undec-9-oxyalkane-poly-ols and 5 oxatetracyclo[7.2.1.0$^{2,8}$.0$^{3,5}$]undec-9-oxyalkane polyols which are contemplated include for instance, the oxyalkanediols, e.g., the 5-oxatetracyclo[6.2.1.0$^{2,7}$.0$^{4,6}$]undec-9-oxypropanediols,
the 5-oxatetracyclo[7.2.1.0$^{2,8}$.0$^{4,6}$]dodec-10-oxybutanediols,
the 5-oxatetracyclo[6.2.1.0$^{2,7}$.0$^{4,6}$]undec-9-oxyhexanediols,
the 5-oxatetracyclo[7.2.1.0$^{2,8}$.0$^{4,6}$]dodec-10-oxyhexanediols, and the like, the oxyalkanetriols, e.g., the 5-oxatetracyclo[6.2.1.0$^{2,7}$.0$^{4,6}$]undec-9-oxybutanetriols,
the 5-oxatetracyclo[7.2.1.0$^{2,8}$.0$^{4,6}$]dodec-11-oxypentanetriols,
the 5-oxatetracyclo[6.1.1.0$^{2,7}$.0$^{4,6}$]undec-9-oxyhexanetriols,
the 5-oxatetracyclo[7.2.1.0$^{2,8}$.0$^{4,6}$]dodec-10-oxyoctanetriols, and the like.

The oxyalkanetetrols, e.g., the 5-oxatetracyclo[6.2.1.0$^{2,7}$.0$^{4,6}$]undec-9-oxyhexanetetrols; and the like; the 5-oxatetracyclo[6.2.1.0$^{2,7}$.0$^{4,6}$]undec-9-oxyalkanepentols; and the like.

It is understood that the useful polycyclic epoxy monomers also include alkyl substituted derivatives of the above compounds particularly wherein the alkyl substitution is effected at non-bridgehead positions. Among the tricyclic compounds, those having the characteristic tricyclo[5.2.1.0$^{2,6}$]decanoid ring structure is preferred.

Specific examples of suitable monomers having characteristic tetracyclic structures such as the tetracyclo-[6.2.1.1$^{3,6}$.0$^{2,7}$]dodecyl, tetracyclo[6.5.1.0$^{2,7}$.0$^{9,13}$]tetradecanoid, or tetracyclo[6.6.1.0$^{2,7}$.0$^{9,14}$]pentadecanoid or the like are for example:

10-oxapentacyclo[6.3.1.1$^{3,6}$.0$^{2,7}$.0$^{9,11}$]tridecan-4-ol,
4-ethyl-10-oxapentacyclo[6.3.1.1$^{3,6}$.0$^{2,7}$.0$^{9,11}$]tridecan-5-ol,
4-ethyl-10-oxapentacyclo[6.3.1.1$^{3,6}$.0$^{2,7}$.0$^{9,11}$]tridecane-4,5-diol,
5-oxapentacyclo[7.6.1.0$^{2,8}$.0$^{4,6}$.0$^{10,15}$]hexadecan-12-ol,
5-oxapentacyclo[6.6.1.0$^{2,7}$.0$^{4,6}$.0$^{9,14}$]pentadecan-11-ol,
5-oxapentacyclo[6.6.1.0$^{2,7}$.0$^{4,6}$.0$^{9,14}$]pentadecane-11,12-diol,
5-methyl-10-oxapentacyclo[6.3.1.1$^{3,6}$.0$^{2,7}$.0$^{9,11}$]tridec-4-ylmethanol,
10-oxapentacyclo[6.3.1.1$^{3,6}$.0$^{2,7}$.0$^{9,11}$]tridec-4-ylmethanol,
5-oxapentacyclo[6.6.1.0$^{2,7}$.0$^{4,6}$.0$^{9,14}$]pentadec-11-ylethanol,
10-oxapentacyclo[6.3.1.1$^{3,6}$.0$^{2,7}$.0$^{9,11}$]tridec-4-yl-n-propanol,
5-oxapentacyclo[7.6.1.0$^{2,7}$.0$^{4,6}$.0$^{9,14}$]hexadec-12-ylisopropanol,
10-oxapentacyclo[6.3.1.1$^{3,6}$.0$^{2,7}$.0$^{9,11}$]tridec-4-yl-n-butanol,
10-oxapentacyclo[6.3.1.1$^{3,6}$.0$^{2,7}$.0$^{9,11}$]tridec-4-ylisobutanol,
5-oxapentacyclo[6.6.1.0$^{2,7}$.0$^{4,6}$.0$^{9,14}$]pentadec-11-yl-n-octan-2-ol.
10-oxapentacyclo[6.3.1.1$^{3,6}$.0$^{2,7}$.0$^{9,11}$]tridec-4-yl-n-decanol, and the like.

Among the oxyalkanols having basic tetracarbocyclic structures which are encompassed within the scope of the invention are, for example, 10-oxapentacyclo[6.3.1.1$^{3,6}$.0$^{2,7}$.0$^{9,11}$]tridec-4-oxy-n-pentanol,
5-oxapentacyclo[6.6.1.0$^{2,7}$.0$^{4,6}$.0$^{9,14}$]pentadec-11-oxyethanol,
5-oxapentacyclo[7.6.1.0$^{2,8}$.0$^{4,6}$.0$^{10,15}$]hexadec-12-oxy-n-propanol,
10-oxapentacyclo[6.3.1.1$^{3,6}$.0$^{2,7}$.0$^{9,11}$]tridec-4-oxyisopropanol,
10-oxapentacyclo[6.3.1.1$^{3,6}$.0$^{2,7}$.0$^{9,11}$]tridec-4-oxy-n-butanol,
5-oxapentacyclo[6.6.1.0$^{2,7}$.0$^{4,6}$.0$^{9,14}$]pentadec-11-oxyisbutanol,
5-oxapentacyclo[7.6.1.0$^{2,8}$.0$^{4,6}$.0$^{10,15}$]hexadec-12-oxy-t-butanol,
10-oxapentacyclo[6.3.1.1$^{3,6}$.0$^{2,7}$.0$^{9,11}$]tridec-4-oxy-n-hexanol,
5-oxapentacyclo[6.6.1.0$^{2,7}$.0$^{4,6}$.0$^{9,14}$]pentadec-11-oxy-n-octan-4-ol,
5-oxapentacyclo[7.6.1.0$^{2,8}$.0$^{4,6}$.0$^{10,15}$]hexadec-12-oxy-n-dodecanol, and the like.

Illustrative oxyalkane-poly-ols based on tetracarbocyclic structures are, for instance, the oxyalkane diols, e.g., the 10-oxapentacyclo[6.3.1.1$^{3,6}$.0$^{2,7}$.0$^{9,11}$]tridec-4-oxypropanediols,
the 5-oxapentacyclo[6.6.1.0$^{2,7}$.0$^{4,6}$.0$^{9,14}$]pentadec-11-oxybutanediols,
the 10-oxapentacyclo[6.3.1.1$^{3,6}$.0$^{2,7}$.0$^{9,11}$]tridec-4-oxypentanediols,
the 5-oxapentacyclo[7.6.1.0$^{2,8}$.0$^{4,6}$.0$^{10,15}$]hexadec-12-oxyhexanediols, and the like;

the oxyalkanetriols, e.g., the 10-oxapentacyclo[6.3.1.1$^{3,6}$.0$^{2,7}$.0$^{9,11}$]tridec-4-oxybutanetriols,
the 5-oxapentacyclo[6.6.1.0$^{2,7}$.0$^{4,6}$.0$^{9,14}$]pentadec-11-oxypentanetriols,
the 10-oxapentacyclo[7,6.1.0$^{2,8}$.0$^{4,6}$.0$^{10,15}$]hexadec-12-oxyhexanetriols,
the 10-oxapentacyclo[6.3.1.1$^{3,6}$.0$^{2,7}$.0$^{9,11}$]tridec-4-oxyoctanetriols, the 10-oxapentacyclo[6.3.1.1$^{3,6}$.0$^{2,7}$.0$^{9,11}$]tridec-4-oxy-nonanetriols, and the like;

the oxyalkanetetrols, e.g., the 10-oxapentacyclo[6.3.1.1$^{3,6}$.0$^{2,7}$.0$^{9,11}$]tridec-4-oxy-hexanetetrols, and the like;
the 10-oxapentacyclo[6.3.1.1$^{3,6}$.0$^{2,7}$.0$^{9,11}$]tridec-4-oxy-alkanepentols, and the like.

Typical methyleneoxyalkanols having these tetracarbocyclic structures include, among others, 10-oxapentacyclo[6.3.1.1$^{3,6}$.0$^{2,7}$.0$^{9,11}$]tridec-4-ylmethyleneoxy-n-pentanol,
5-oxapentacyclo[6.6.1.0$^{2,7}$.0$^{4,6}$.0$^{9,14}$]pentadec-11-ylmethylene-oxyethanol,
10-oxapentacyclo[7.6.1.0$^{2,8}$.0$^{4,6}$.0$^{10,15}$]hexadec-12-ylmethylene-oxy-n-propanol,
10-oxapentacyclo[6.3.1.1$^{3,6}$.0$^{2,7}$.0$^{9,11}$]tridec-4-ylmethylene-oxyisopropanol,
10-oxapentacyclo[6.3.1.1$^{3,6}$.0$^{2,7}$.0$^{9,11}$]tridec-4-ylmethylene-oxy-n-butanol,
10-oxapentacyclo[6.3.1.1$^{3,6}$.0$^{2,7}$.0$^{9,11}$]tridec-4-ylmethylene-oxy-n-butanol,
10-oxapentacyclo[6.3.1.1$^{3,6}$.0$^{2,7}$.0$^{9,11}$]tridec-4-ylmethylene-oxy-n-dodecanol, and the like.

Illustrative methyleneoxyalkane-poly-ols which are contemplated include, for instance, the 10-oxapentacyclo[6.3.1.1$^{3,6}$.0$^{2,7}$.0$^{9,11}$]tridec-4-ylmethyleneoxyalkanediols, e.g., the 10-oxapentacyclo[6.3.1.1$^{3,6}$.0$^{2,7}$.0$^{9,11}$]tridec-4-ylmethylene-oxypropanediols,
the 5-oxapentacyclo[6.6.1.0$^{2,7}$.0$^{4,6}$.0$^{9,14}$]pentadec-11-yl-methyleneoxybutanediols,
the 10-oxapentacyclo[7.6.1.0$^{2,8}$.0$^{4,6}$.0$^{10,15}$]tridec-12-methyleneoxypentanediols,
the 10-oxapentacyclo[6.3.1.1$^{3,6}$.0$^{2,7}$.0$^{9,11}$]tridec-4-ylmethylene-oxyhexanediols,
the 10-oxapentacyclo[6.3.1.1$^{3,6}$.0$^{2,7}$.0$^{9,11}$]tridec-4-ylmethylene-oxyoctanediols, and the like;
the methyleneoxyalkanetriols, e.g.,
the 10-oxapentacyclo[6.3.1.1$^{3,6}$.0$^{2,7}$.0$^{9,11}$]tridec-4-ylmethyleneoxybutanetriols,
the 5-oxapentacyclo[6.6.1.0$^{2,7}$.0$^{4,6}$.0$^{9,14}$]pentadec-11-yl-methyleneoxypentanetriols,
the 10-oxapentacyclo[6.3.1.1$^{3,6}$.0$^{2,7}$.0$^{9,11}$]tridec-4-ylmethyleneoxyoctanetriols, and the like;

the methyleneoxyalkanetetrols, e.g., the 10-oxapentacyclo[6.3.1.1$^{3,6}$.0$^{2,7}$.0$^{9,11}$]tridec-4-ylmethyleneoxyhexanetetrols and the like; the 10-oxapentacyclo-[6.3.1.1$^{3,6}$.0$^{2,7}$.0$^{9,11}$]tridec-4-ylmethyleneoxyalkanepentols; and the like.

The 10-oxapentacyclo[6.3.1.1$^{3,6}$.0$^{2,7}$.0$^{9,11}$]tridec-4,5-ylene-dialkanols are exemplified, preferably, by such compounds as 10-oxapentacyclo[6.3.1.1$^{3,6}$.0$^{2,7}$.0$^{9,11}$]tridec-4,5-ylene-dimethanol, 10-oxapentacyclo[6.3.1.1$^{3,6}$.0$^{2,7}$.0$^{9,11}$]tridec-4,5-ylene-diethanol, and the like.

It is understood that the useful compounds also include alkyl substituted derivatives of the above compounds, particularly wherein the alkyl substitution is effected by non-bridgehead positions. Among the tetracyclic compounds, those having the characteristic tetracyclo[6.2.1.1$^{3,6}$.0$^{2,7}$] dodecyl ring are preferred.

Further illustrative of useful polycyclic hydroxy compounds having even five and six carbocycles in the basic ring structure are the following:

11-oxahexacyclo[6.6.1.1$^{3,6}$.0$^{2,7}$.0$^{9,14}$.0$^{10,12}$]hexadecan-4-ol,
11-oxahexacyclo[6.6.1.1$^{3,6}$.0$^{2,7}$.0$^{9,14}$.0$^{10,12}$]hexadecyl-4-butanediol,
5-oxahexacyclo[7.6.1.1$^{11,14}$.0$^{2,8}$.0$^{4,6}$.0$^{10,15}$]heptadec-12-oxyethanol,
5-oxahexacyclo[7.6.1.1$^{11,14}$.0$^{2,8}$.0$^{4,6}$.0$^{10,15}$]heptadec-12-oxybutanediol,
pentacyclo[10.2.1.1$^{5,8}$.0$^{2,11}$.0$^{4,9}$]hexadecane-6,7,13-triol,
5-oxaheptacyclo[7.6.1.1$^{3,7}$.1$^{11,14}$.0$^{2,8}$.0$^{4,6}$.0$^{10,15}$]octadecan-12-ol,
5-oxaheptacyclo[7.6.1.1$^{3,7}$.1$^{11,14}$.0$^{2,8}$.0$^{4,6}$.0$^{10,15}$]octadec-12-oxyethanol, and the like.

It is again pointed out that alkyl substituted derivatives of these compounds are also included particularly when the alkyl substitution is effected at a nonbridgehead position.

As hereinbefore pointed out the production of the polycyclic polyether polyols used in the coatings of this invention are polymerized by contacting monomer, illustrated above, catalyst, and chain length modifier.

It is apparent that control of the length of the polymer will be dependent upon the relative amuonts of monomer and chain length modifier in the polymerization process. The approximate ratio between these two components of the polymerization reaction may be calculated by the following formula $$\frac{\text{Moles of Epoxy Monomer}}{\text{Moles of Chain Modifier}} = \frac{n+1}{(E-1)n+E}$$

wherein $n+1$ represents the number of repeating units desired in the ultimate polymer product, and wherein E represents the number of epoxy groups in each monomer molecule. Thus, to produce a polymer having a chain length averaging 15 monomer units from a monoepoxy alcohol or polyol such as used for the instant coatings, there would be added about 15 moles of monomer to about 1 mole of water. Particularly when polymerizing monoepoxy alcohols or polyols, the mass ratio between the amount of monomer and the amount of chain length modifier is fairly large and thus an excess of up to about 25 percent by weight of chain length modifier is at times desirable in order to obtain the desired chain modifying effect. For example, if it is desired to polymerize 5-oxatetracyclo[6.2.1.0$^{2,7}$.0$^{4,6}$]undecan-9(10)-ol to a chain length of 15 employing water as a chain length modifier, the above formula would dictate a molar ratio of 15:1 which corresponds to a mass ratio of the reactants of about 120:1. Thus in such an instance it readily can be appreciated that the mass polymerization dynamics of the system might well require a 25 percent excess of water (i.e., increasing the amount to about 1.25 moles) to obtain chain length as desired. In fact in such instances, although excess water is employed, analysis of the final reaction mixture usually reveals no more than trace amounts of the water, the loss being possibly ascribed to evaporation loss, or perhaps a small amount of hydrogen bonding with the polyether polyol or the like.

Since the polymerization broadly involves contacting the monomer with a hydroxyl containing chain length modifier in the presence of catalyst, (the amount of chain modifier to be determined by the chain length desired in the polymer), the polymerization scheme for producing the polycyclic polyether polyols may be represented by the following block formulae wherein a polymer of $n+1$ repeating units is produced by contacting a monoepoxy alcohol or polyol and chain modifier in the hereinbefore prescribed molar proportions, in the presence of catalyst to obtain the polymer (I) above.

III

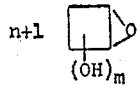 + catalyst + 1 ROH ⟶ 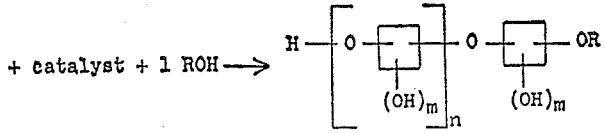

wherein ▢ represents the entire remaining portion of the monoepoxy alcohol or polyol molecule excluding the cyclic vicinal epoxy group and the hydroxyl groups, wherein ROH represents the hydroxyl containing chain length modifier hereinafter more explicitly defined (the R portion of the chain length modifier being that which serves to cap the polymer), and wherein $m$ represents the number of hydroxyl groups in the monomer. Since, (V) (a) 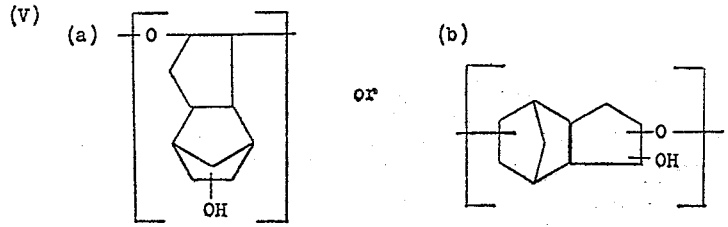

peating units resulting from the fact that each monomer has at least 3 possible sites for polymerization. Thus, for example, a polymer of 5-oxatetracyclo[6.2.1.0$^{2,7}$.0$^{4,6}$]undecan-9(10)-ol could contain repeating units such as the following (b) 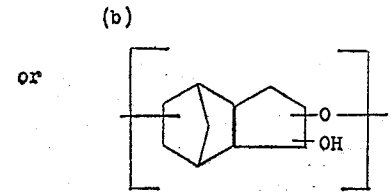

or

As a further illustration, a polymer of 5-oxatetracyclo[6.2.1.0$^{2,7}$.0$^{4,6}$]undec-9-yl propane-2,3-diol is postulated to have repeating units such as VI (a) 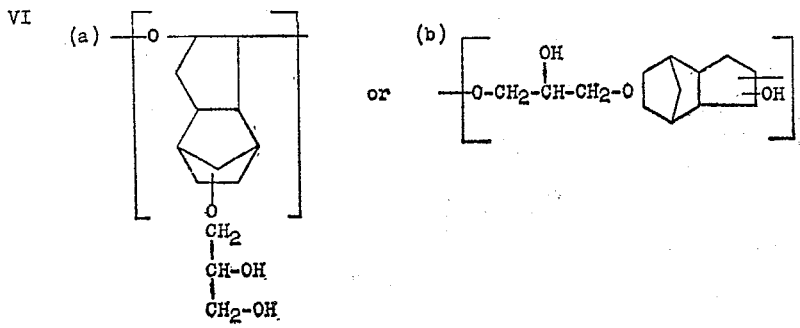

(b) 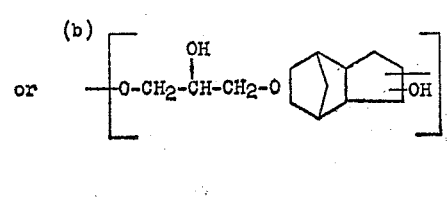

or as pointed out hereinabefore, preferred polycyclic epoxy monomers are those wherein the hydroxyl groups are bonded directly to the polycarbocyclic ring. In a preferred aspect, ▢ in the above block formulae represents a polycarbocyclic ring such as illustrated above.

Similarly, the production of the less preferred polycyclic polyether polyols polymerized from a monomeric diepoxide or a diepoxy alcohol illustrated as polymer (II) above, may be represented as follows again with recourse to the prescribed molar proportions of monomer and catalyst hereinbefore set forth:

IV

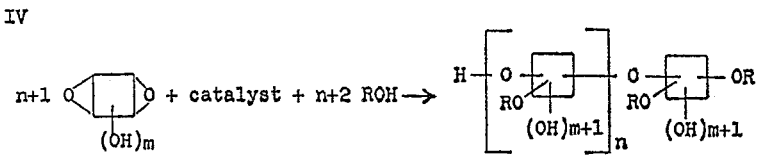

wherein the symbols have similar designations as above. It is pointed out that in the above equations the relative amount of chain length modifier set forth is the theoretical amount. As pointed out hereinbefore, the reaction dynamics of the polymerization system are such that an excess of chain modifier is preferred.

It is pointed out that the novel process of this invention may be employed as above to produce copolymers of two different polycylic monoepoxy alcohols, monoepoxy polyols, diepoxides or diepoxy alcohols, or diepoxy polyols. Molecular weight can be controlled in the same manner as set forth above.

Thus the polycyclic polyether polyols are identified, as can be seen from the above structures by at least one hydroxyl group for each repeating unit. Polymers having from about 8 to about 25 repeating units demonstrate a balance of properties which make them extremely useful in the production of coatings and accordingly it is preferred to utilize such polymers in the water reducible coatings of this invention. It is eminently preferred to employ controlled molecular weight polymers containing an average of from about 10 to about 16 repeating units.

The polymers produced by the novel process of this invention are believed to consist of various isomeric re- Since it would appear that in the majority of instances the polymerization is effected through the cyclic vicinal epoxy group itself alone or through the vicinal epoxy group on one hand and a hydroxyl group elsewhere in the monomer molecule. The polycyclic polyether polyols may be identified by repeating (polycycloalkyl)oxy, (alkylpolycycloalkyl)oxy, (alkoxypolycycloalkyl)oxy, or (poly(alkoxy)polycycloalkyl)oxy groups wherein said polycycloalkyl portion is as hereinbefore defined a saturated polycyclic structure comprising at least one integral bicyclo[2.2.1]heptanoid structure alone or as part of a fused polycarbocyclic ring structure having up to 6 carbocycles. The polycycloalkyl portion of each repeating unit of the polymer may of course be further substituted by hydroxyl groups bonded to the polycarbocyclic ring directly or through a bivalent organic radical such as an alkylene, alkoxy, or poly(alkoxy) group, or by alkyl groups, such substitution being preferably effected at non-bridgehead positions. Furthermore, the alkyl or alkoxy portion of a repeating (alkylpolycycloalkyl)oxy or (alkoxypolycycloalkyl)oxy or the like, may also be substituted with hydroxyl such as the structure illustrated in Formula VI(b). Since preferred monomers are monoepoxy alcohols or polyols wherein the hydroxyl groups are bonded directly to the polycarbocyylic structure, preferred polycyclic polyether polyols are identified by repeating (polycycloalkyl)oxy groups, e.g., Formula V(a), which are additionally substituted with hydroxyl groups bonded directly to the polycarbocyclic ring.

The chain length modifiers useful in the polymerization process to produce the polycyclic polyether polyols are nonepoxy hydroxyl containing compounds free from phenolic hydroxyl groups (i.e., hydroxyl groups bonded directly to a benzenoid ring) which correspond to the formula

R—OH wherein R represents hydrogen (in which case the chain length modifier is water) or a monovalent organic radical free from substituents other than alcoholic hydroxy groups which react with epoxy groups. The novel chain modifiers used in the novel polymerization process include hydrocarbyl alcohols and polyols further substituted with other groups not reactive with epoxy groups such as halo groups, ether linkages, and the like. Highly preferred as a chain length modifier is water. Other preferred chain length modifiers include aliphatic alcohols, aliphatic polyols, cycloaliphatic alcohols, and cycloaliphatic polyols including such compounds which contain aryl substituents, so long as there are no phenolic hydroxyl groups in the compound. Also suitable as chain length modifiers are the ether alcohols, the ether glycols, and the polyoxyalkylene glycols. Preferred chain length modifiers include the alkanols, alkanepolyols, cycloalkanols, and cycloalkanepolyols.

Typical hydroxy containing organic compounds suitable as chain length modifiers include methanol, ethanol, ethylene glycol, ethylene chlorohydren, ethylene bromohydren, n-propanol, isopropanol, propylene glycol, glycerol, n-butanol, 2-butanol, isobutanol, 1,4-butanediol, 2,2'-dimethyl-1,3-butanediol, pentaerythritol, trimethylolpropane, aryl alcohol, 1,5-pentanediol, n-hexanol, hexylene glycol, 2-ethylhexanol, 1,2,6-hexanetriol, sorbitol, n-octanol, iso-octanol (mixed isomers) tridecanol, 2,6-dimethylheptanol, diethylene glycol, triethylene glycol, tetraethylene glycol, dipropylene glycol, the poly(oxyethyene) glycols, poly(oxypropylene) glycols, alkylene glycol, monoalkyl ethers such as 1-methoxy-2-ethanol, 1-ethoxy-2-ethanol, 1-isopropoxy-2-ethanol, including the ethers of polyalkylene glycols, such as the monobutyl ether of triethylene glycol; cycloalkanols such as cyclohexanol, 4-methylcyclohexanol, cyclohexylmethanol, cyclopentanol, cyclopentane-1,3-diol, including compounds having polycarbocyclic structures similar to those of the monomers hereinbefore described such as bicyclo[2.2.1]heptan-2,6-diol, 3-4-dihydroxytricyclo[2.2.1]heptyl-6-methanol, tricyclo[5.2.1.0$^{2,6}$]decan-4,5,9 - triol, 4,5 - dihydroxytricyclo [6.2.1.0$^{2,7}$]undec-10-oxyethanol, and the like, aryl substituted alcohols such as benzyl alcohol, phenyl methyl carbinol, and other alcohols such as propionyl alcohol, tetrahydropyran methanol, and the like.

The use of polyhydroxy chain length modifiers, such as for example, ethylene glycol or 1,2,6-hexanetriol will increase the hydroxyl functionality of the polymer and hence may be desirable. However, such straight chain aliphatic substituents or poly(oxyalkylene) substituents tend to decrease the hardness and rigidity of the polycarbocyclic polymeric structure. Thus it is apparent that by appropriate choice of the chain modifier a variance in functionality and in properties of the polymer, and the ultimate coating, may be effected.

The catalysts useful in the novel process of this invention are acidic catalysts selected from the group consisting of inorganic acids and Lewis acid catalysts. Suitable catalysts include phosphoric acid, sulfuric acid, sulfonic acid and the sharply acid ion exchange resins and the like. Other catalysts include boron trifluoride and boron trifluoride complexes of the type which contain no active hydrogen in the complex such as the boron trifluoride etherates; and the Lewis acid salts such as stannic chloride, aluminum chloride, zinc chloride, antimony pentachloride, and the like. Preferred are boron trifluoride and the boron trifluoride etherate; boron trifluoride itself is eminently preferred.

Catalysts are employed in small catalytically effective amounts generally from about 0.2 to about 5 percent by weight based upon the weight of the monomer employed. The catalyst addition should be carried out in such a manner as to insure the presence of free catalyst in the polymerization mixture until the monomer is almost completely converted to polymer, i.e., until testing of the reaction mixture reveals virtual absence of monomer. Preferably catalyst addition should be maintained until at least 75 percent of the monomer has been converted.

The polymerization reaction may be carried out over a broad range of temperature. Generally due to the exothermic reaction which accompanies the catalytic action of the polymerization it is preferred to maintain the polymerization mixture at moderate temperatures during the catalyst addition. Following the catalyst addition the temperature may be raised, however excessive temperatures, although not destructive to the reaction can often result in a discoloration of the polymer product and hence should be avoided. Temperatures which can result in boiling of the chain length modifier, of course should be avoided. Temperatures in the range of about 10° C. to about 70° C. are suitable during catalyst addition. Preferably the temperature is maintained at from about 25° C. to about 50° C. during this stage of the reaction. At the lower temperatures, the polymerization rate becomes slow. Following catalyst addition the temperature may be raised suitably to up to 100° C. Completion of the polymerization may be ascertained by periodic sampling of the polymerization mixture.

Pressure is wholly non-critical to the process, and the polymerization may be conducted under subatmospheric, superatmospheric or atmospheric conditions. Again, if operation at subatmospheric conditions is desired, care should be taken to insure that substantial vaporization of the chain length modifier is not permitted to occur under the prevailing reaction conditions.

The above polymerization reaction may be effected employing either solution or suspension polymerization techniques. Solution polymerization is effected by conducting the reaction in the presence of an organic medium which is a solvent for the monomer, the chain length modifier, the polymer desired, and catalyst. Of course in the case of ion exchange resin catalyst, the resin will not dissolve. Basic solvents such as pyridine, dimethyl formamide, dimethyl sulfoxide and nitrile solvents appear to tend to inhibit the reaction, perhaps by tending to neutralize the acidic polymerization catalysts. Consequently, non-basic or neutral solvents are preferred. Highly preferred as a solvent is dioxane.

Following completion of the polymerization recovery of the polymer and separation of polymer from catalyst may be accomplished by known techniques.

Suspension polymerization techniques may also be employed to conduct the novel polymerization of this invention. In such a procedure the polymerization is conducted in the presence of a medium which is a solvent for the monomer the chain length modifier and the catalyst (again excepting ion exchange resins) but which does not dissolve the polymer. Thus the polymer upon formation will precipitate from solution, and may then be recovered. Suitable mediums for the suspension polymerization include chlorinated hydrocarbons such as 1,4-dichlorobutane, amylene dichloride, and the like, chlorinated ethers such as dichloroethyl ether, triglycol dichloride, dichloroisopropyl ether, and the like as well as other compounds such as bis(chloroethyl)carbonate. Hydrocarbons, such as aromatic hydrocarbons and the like are suitable, but give rise to process difficulty resulting from the relative insolubility of even short chain polymers in this type of medium. Thus precipitation of short chain polymers tends to complicate process considerations. However, all mediums which dissolve monomer and catalyst in which the polymer product is insoluble are operable. Recovery of the polymer from the suspension polymerization product is also accomplished by known techniques.

The preparation of the polycyclic epoxy monomers useful in the process of this invention may be accomplished by known methods. For example, the preparation of monoepoxy alcohols, monoepoxy oxyalkanols, monoepoxy oxyalkane polyols, as well as the monoepoxy diols of the compounds having the tricyclo[5.2.1.0$^{2,6}$]decanoid ring or the tetracyclo[6.2.1.1$^{3,6}$.0$^{2,7}$]dodecanoid ring is disclosed in French Patent No. 1,305,630. Monoepoxy hydroxyl-containing compounds having other polycarbocyclic ring structures as illustrated herein may be prepared by analogous procedures employing the polycarbocyclic diene corresponding to the desired ring structure in the place of dicyclopentadiene as employed in the preparative procedures in the above cited French patent.

The polycarbocyclic dienes corresponding to ring structures hereinbefore illustrated and set forth may be prepared by Diels-Alder addition. For example, the tricyclo[6.2.1.0$^{2,7}$]undeca-2,9- diene ring is obtained by Diels-Alder addition of bicyclo[2.2.1]heptadiene and butadiene. Similarly tetracyclo[6.5.1.0$^{2,7}$.0$^{9,13}$]tetradeca-3,11-decadiene can be synthesized by Diels-Alder addition of tricyclo[5.2.1.0$^{2,6}$]deca-3,8-diene and butadiene. To further illustrate, hexacyclo[6.6.1.1$^{3,6}$.1$^{10,13}$.0$^{2,9}$0$^{9,14}$] heptadeca-4,11-diene may be produced by Diels-Alder addition of cyclopentadiene to tetracyclo[6.2.1.1$^{3,6}$0$^{2,7}$] dodeca-4,9-diene. Monoepoxy diols may be conveniently prepared by hydrolyzing the above diepoxides with an equimolar amount of water under very slightly acidic conditions.

Diepoxides useful in preparing the polycyclic polyether polyols of the instant invention may be prepared by epoxidation of the corresponding dienic precursor with sufficient epoxidizing agent, to introduce the vicinal cyclic epoxy group at both unsaturated sites in the polycarbocyclic ring. Suitable epoxidizing agents, and conditions for diepoxidation are similar to those disclosed in French Patent 1,305,630 for epoxidizing the polycyclic alcohols to obtain the monoepoxy alcohols.

It is to be understood that the polycyclic epoxy monomers containing the oxymethyleneoxy radical, i.e., —OCH$_2$O—, are not encompassed within the scope of monomers useful for preparation of polycyclic polyether polyols used herein. Accordingly compounds having an oxymethanol group, an oxymethyleneoxyalkanol group, an oxymethyleneoxy polyol group or the like are not to be deemed included with the polycyclic hydroxy compounds useful in the compositions of this invention.

In referring to the ring structures of the polycyclic hydroxy compounds of this invention the suffix "oid" has been used. This suffix indicates resemblance or likeness and is employed in instances wherein there is no attempt to characterize the polycyclic epoxy monomers themselves but only to illustrate the type of ring structures they possess.

As pointed out above, acid number is defined as milligrams of potassium hydroxide required to neutralize a grams of sample, regardless of which base is actually employed in the neutralization. The determination can be made for example, by digesting the sample in a measured amount of potassium hydroxide, or any other base like trimethyl ammonium hydroxide, and then titrating with acid to determine the amount of base consumed. If another base is employed the equivalents consumed are translated to the corresponding amount of potassium hydroxide.

Amine number is also milligrams of potassium hydroxide per gram of sample. To determine amine number, however the sample is titrated with acid, e.g., perchloric acid, and the equivalents of acid consumed is translated again to equivalents in terms of potassium hydroxide.

The following examples are illustrative.

Example 1

To a 100 gallon glass lined autoclave equipped with a propeller-type agitator and a baffle was added 277 pounds of bis(2-chloroethyl)ether. The stirred liquid was heated to 30° C. and maintained at that temperature while adding simultaneously a solution of 225 pounds (1.355 lb. moles) of 5-oxatetracyclo[6.2.1.0$^{2,7}$.0$^{4,6}$]undecan-9, (10)-ol, and 3.38 pounds (.188 lb. mole) of water in 225 pounds of dioxane and a solution of 4.5 pounds of BF$_3$-etherate catalyst dissolved in 31.5 pounds of dioxane over a period of six and a half hours. During the addition a precipitate was formed appearing as a brown-purple slurry. The mixture was maintained at 30° C. for an additional 30 minutes following the catalyst and monomer addition and then was heated to 50° C. and maintained for 4 hours. The mixture was then cooled and the slurry was filtered. The precipitate was reslurried in 450 pounds of a 1% aqueous solution of a nonyl phenyl polyethylene glycol having an average of 9 repeating ethyleneoxy units for two hours and filtered. The polymerization product obtained was rinsed with water until the filtrate was clear. The filtrate then was reslurried in 450 pounds of a 1 percent sodium hydroxide solution and was heated to 65° C. for four hours. Following cooling and filtration the polymerization product was washed with water until neutral to moist litmus paper. After drying overnight there was obtained 155 pounds of a white powdered polymerization product having a hydroxyl equivalent weight of 145.4 which corresponded to a polymer having 13.26 repeating units. The polymerization product contained 11.69 percent hydroxyl based on the total weight of nonvolatiles. A 50 weight percent solution of the polymerization product in dimethyl formamide demonstrated a viscosity of .240 centipoise at about 25° C. and a Gardner color value of 3.

Example 2

(A) To a five-liter flask equipped with a stirrer were added 960 grams (6.62 equivalents) of a polymeric polyol of 5-oxatetracyclo[6.2.1.0$^{2,7}$.0$^{4,6}$]undecan-9(10)-ol prepared in Example 1 having a hydroxyl equivalent weight of 145 indicating an average of approximately 13 repeating units, 2040 grams of soya acid (7.28 equivalents), and 130 grams of xylene. The amount of soya acid added represented a 10 percent excess of carboxyl groups based upon the hydroxyl equivalency of the polymer. The mixture was heated to 225° C. and maintained at this temperature for 6 hours under a nitrogen atmosphere. The reaction mixture appeared as a viscous yellowish liquid which upon titration with potassium hydroxide was found to have an acid number of 14.4 indicating that the esterification was substantally complete.

(B) The reaction mixture obtained above was then cooled to 60° C. and 100.7 grams of maleic anhydride (2.05 equivalents) were added. To prevent discoloration of the product 14.9 grams of diphenyl pentaerythritol diphosphite, a stabilizer was added also. After the maleic anhydride was completely dissolved, 2.98 grams of iodine in 29.8 grams of xylene were added. The reaction mixture was heated to 225° C. and held at this temperature for 2 hours. Titration of the reaction product mixture with potassium hydroxide revealed the adduct had an acid number of 28.3.

(C) To the agitated ester polyol-carboxylic acid adduct at a temperature of 80° C. were added 3.0 grams of triethylamine in 73.8 grams of water and cooked for one hour. To the reaction product mixture there was then added 201 grams of dimethyl ethanolamine (2.26 equivalents) 988 grams of propoxy propanol and 247 g. of butyl carbitol. Amidst additional stirring, 2070 grams of water were also added. The resulting solution contained about 42 percent by weight resin solids which were completely dissolved.

Example 3

(A) To a five-liter flask equipped with a stirrer were added 936.7 grams (6.46 equivalents) of a polymeric polyol of 5-oxatetracyclo[6.2.1.0$^{2,7}$.0$^{4,6}$]undecan-9(10)-ol prepared in Example 1 having a hydroxyl equivalent weight of 145 indicating approximately 13 repeating units, 1990 grams of soya acid (7.11 equivalents) and 130 grams of xylene. The amount of soya acid added represented a 7.5 percent excess of carboxyl groups based upon the hydroxyl equivalency of the polymer. The mixture was heated to 225° C. and maintained at this temperature for 8 hours under a nitrogen atmosphere. The reaction mixture appeared as a viscous yellowish liquid which upon titration with potassium hydroxide was found to have an acid number of 15.3 indicating that the esterification was substantially complete.

(B) The reaction mixture obtained above was then cooled to 80° C. and 171.8 grams of maleic anhydride (3.51 equivalents) were added. To prevent discoloration of the product 14.9 grams of diphenyl pentaerythritol diphosphite, a stabilizer was added also. After the maleic anhydride had been completely dissolved, 2.97 grams of iodine in 29.7 grams of xylene were added. The reaction mixture was heated to 225° C. and held at this temperature for 2 hours.

(C) To the agitated ester polyol-carboxylic acid adduct at a temperature of 75° C. were added 310 grams of dimethyl ethanolamine (3.48 equivalents) in 330 grams of water. To the reaction product mixture there was then added 988 grams of propoxy propanol and 248 grams of butyl carbitol. Amidst additional stirring, 2700 grams of water were also added. The resulting solution contained about 40 percent by weight resin solids which were completely dissolved.

Example 4

(A) To a five-liter flask equipped with a stirrer was added 914 grams (6.30 equivalents) of a polymeric polyol of 5 - oxatetracyclo[6.2.1.0$^{2,7}$.0$^{4,6}$]undecan-9(10) - ol prepared in Example 1 having a hydroxyl equivalent weight of 145 indicating approximately 13 repeating units, 1942 grams of soya acid (6.93 equivalents) and 150 grams of xylene. The amount of soya acid added represented a 10 percent excess of carboxyl groups based upon the hydroxyl equivalency of the polymer. The mixture was heated to 225° C. and maintained at this temperature for 10 hours under a nitrogen atmosphere. The reaction mixture appeared as a viscous yellowish liquid which upon titration with potassium hydroxide was found to have an acid number of 15.7 indicating that the esterification was substantially complete.

(B) The reaction mixture obtained above was then cooled to 80° C. and 239.5 grams of maleic anhydride (4.89 equivalents) were added. To prevent discoloration of the product 14.9 grams of diphenyl pentaerythritol diphosphite, a stabilizer was added also. After the maleic anhydride had been completely dissolved, 2.96 grams of iodine in 29.6 grams of xylene were added. The reaction mixture was heated to 225° C. and held at this temperature for 2 hours.

(C) To the agitated ester polyol-carboxylic acid adduct at a temperature of 70° C. were added 477 grams of dimethyl ethanolamine (5.36 equivalents) in 330 grams of water. To the reaction product mixture there was then added 988 grams of propoxy propanol and 247 grams of butyl carbitol. Amidst additional stirring, 2370 grams of water were also added. The resulting solution contained about 38.7 percent by weight resin solids which were completely dissolved.

Example 5

(A) To a five-liter flask equipped with a stirrer were added 429 grams (2.96 equivalents) of a polymeric polyol of 5 - oxatetracyclo[6.2.1.0$^{2,7}$.0$^{4,6}$]undecan-9(10) - ol prepared in Example 1 having a hydroxyl equivalent weight of 145 indicating approximately 13 repeating units, 995 grams of soya acid (3.55 equivalents) and 100 grams of xylene. The amount of soya acid added represented a 20 percent excess of carboxyl groups based upon the hydroxyl equivalency of the polymer. The mixture was heated to 225° C. and maintained at this temperature for 6½ hours under a nitrogen atmosphere. The reaction mixture appeared as a viscous yellowish liquid which upon titration with potassium hydroxide was found to have an acid number of 23.5 indicating that the esterification was substantially complete.

(B) The reaction mixture obtained above was then cooled to 80° C. and 119.5 grams of maleic anhydride (2.44 equivalents) were added. To prevent discoloration of the product 7.4 grams of diphenyl pentaerythritol diphosphite, a stabilizer was added also. After the maleic anhydride had been completely dissolved, 1.48 grams of iodine were added. The reaction mixture was heated to 225° C. and held at this temperature for 2 hours.

(C) To the agitated ester polyol-carboxylic acid adduct at a temperature of 80° C. were added 238.8 grams of dimethyl ethanolamine (2.68 equivalents) in 159 grams of water. To the reaction product mixture there was then added 477.3 grams of propoxy propanol and 119.3 grams of butyl carbitol. Amidst additional stirring, 1140.8 grams of water were also added. The resulting solution contained about 40 percent by weight resin solids which were completely dissolved.

Example 6

(A) To a five-liter flask equipped with a stirrer were added 440 grams (3.03 equivalents of a polymeric polyol of 5 - oxatetracyclo[6.2.1.0$^{2,7}$.0$^{4,6}$]undecan-9(10) - ol prepared in Example 1 having a hydroxyl equivalent weight of 145 indicating approximately 13 repeating units, 1020 grams of soya acid (3.64 equivalents) and 100 grams of xylene. The amount of soya acid added represented a 20 percent excess of carboxyl groups based upon the hydroxyl equivalency of the polymer. The mixture was heated to 225° C. and maintained at this temperature for 6 hours under a nitrogen atmosphere. The reaction mixture appeared as a viscous yellowish liquid which upon titration with potassium hydroxide was found to have an acid number of 24.1 indicating that the esterification was substantially complete.

(B) The reaction mixture obtained above was then cooled to 80° C. and 85.9 grams of maleic anhydride (1.75 equivalents) were added. To prevent discoloration of the product 7.4 grams of diphenyl pentaerythritol diphosphite a stabilizer was added also. After the maleic anhydride had been completely dissolved, 1.48 grams of iodine were added. The reaction mixture was heated to 225° C. and held at this temperature for 2 hours.

(C) To the agitated ester polyol-carboxylic acid adduct at a temperature of 75° C. were added 171.7 grams of dimethyl ethanolamine (1.93 equivalents) in 159.2 grams of water. To the reaction product mixture there was then added 477.1 grams of propoxy propanol and 119.3 grams of butyl carbitol. Amidst additional stirring, 1141 grams of water were also added. The resulting solution contained about 40 percent by weight resin solids which were completely dissolved.

Example 7

(A) To a five-liter flask equipped with a stirrer were added 556.9 grams (3.84 equivalents) of a polymeric polyol of 5-oxatetracyclo[6.2.1.0$^{2,7}$.0$^{4,6}$]undecan-9(10)-ol prepared in Example 1 having a hydroxyl equivalent weight of 145 indicating approximately 13 repeating units, 1112 grams of tall acid (3.84 equivalents) and 150 grams of xylene. The amount of tall acid added represented an equivalent amount of carboxyl groups based upon the hydroxyl equivalency of the polymer. The mixture was heated to 225° C. and maintained at this temperature for 6½ hours under a nitrogen atmosphere. The reaction mixture appeared as a viscous yellowish liquid which upon titration with potassium hydroxide was found to have an acid number of less than 12 indicating that the esterification was substantially complete.

(B) The reaction mixture obtained above was then cooled to 80° C. and 139.7 grams of maleic anhydride (2.85 equivalents) were added. To prevent discoloration of the product 8.68 grams of diphenyl pentaerythritol diphosphite a stabilizer was added also. After the maleic anhydride had been completely dissolved, 1.74 grams of iodine were added. The reaction mixture was heated to 225° C. and held at this temperature for 2 hours.

(C) To the agitated ester polyol-carboxylic acid adduct at a temperature of 80° C. were added 279.1 grams of dimethyl ethanolamine (3.14 equivalents) in 185.3 grams of water. To the reaction product mixture there was then added 555.9 grams of propoxy propanol and 139.0 grams of butyl carbitol. Amidst additional stirring, 1329 grams of water were also added. The resulting solution contained about 40 percent by weight resin solids which were completely dissolved.

Example 8

(A) To a five-liter flask equipped with a stirrer were added 520.5 grams (3.59 equivalents) of a polymeric polyol of 5-oxatetracyclo[6.2.1.0$^{2,7}$.0$^{4,6}$]undecan-9(10)-ol prepared in Example 1 having a hydroxyl equivalent weight of 145 indicating approximately 13 repeating units, 1143 grams of tall acid (3.95 equivalents) and 150 grams of xylene. The amount of tall acid added represented a 10 percent excess of carboxyl groups based upon the hydroxyl equivalency of the polymer. The mixture was heated to 225° C. and maintained at this temperature for 6 hours under a nitrogen atmosphere. The reaction mixture appeared as a viscous yellowish liquid which upon titration with potassium hydroxide was found to have an acid number of 16.1 indicating that the esterification was substantially complete.

(B) The reaction mixture obtained above was then cooled to 80° C. and 139.6 grams of maleic anhydride (2.85 equivalents) were added. To prevent discoloration of the product 8.68 grams of diphenyl pentaerythritol diphosphite a stabilizer was added also. After the maleic anhydride had been completely dissolved, 1.72 grams of iodine were added. The reaction mixture was heated to 225° C. and held at this temperature for 2 hours.

(C) To the agitated ester polyol-carboxylic acid adduct at a temperature of 75° C. were added 278.9 grams of dimethyl ethanolamine (3.13 equivalents) in 185.2 grams of water. To the reaction product mixture there was then added 555.6 grams of propoxy propanol and 138.9 grams of butyl carbitol. Amidst additional stirring, 1327.9 grams of water were also added. The resulting solution contained about 40 percent by weight resin solids which were completely dissolved.

Example 9

(A) To a five-liter flask equipped with a stirrer was added 523.4 grams (3.61 equivalents) of a polymeric polyol of 5-oxatetracyclo[6.2.1.0$^{2,7}$.0$^{4,6}$]undecan-9(10)-ol prepared in Example 1 having a hydroxyl equivalent weight of 145 indicating approximately 13 repeating units, 1162 grams of soya acid (4.15 equivalents) and 150 grams of xylene. The amount of soya acid added represented a 15 percent excess of carboxyl groups based upon the hydroxyl equivalency of the polymer. The mixture was heated to 225° C. and maintained at this temperature for 6¼ hours under a nitrogen atmosphere. The reaction mixture appeared as a viscous yellowish liquid which upon titration with potassium hydroxide was found to have an acid number of 24.0 indicating that the esterification was substantially complete.

(B) The reaction mixture obtained above was then cooled to 75° C. and 120.3 grams of maleic anhydride (2.45 equivalents) were added. To prevent discoloration of the product 8.70 grams of diphenyl pentaerythriol diphosphite a stabilizer was added also. After the maleic anhydride had been completely dissolved, 1.73 grams of iodine were added. The reaction mixture was heated to 225° C. and held at this temperature for 2 hours. Titration of the reaction product mixture with benzyl trimethyl ammonium hydroxide revealed the adduct had an acid number of 66.2.

(C) To the agitated ester polyol-carboxylic acid adduct at a temperature of 75° C. were added 240.0 grams of dimethyl ethanolamine (2.70 equivalents) in 185.5 grams of water. To the reaction product mixture there was then added 556.5 grams of propoxy propanol and 139.1 grams of butyl carbitol. Amidst additional stirring, 1330 grams of water were also added. The resulting solution contained about 39 percent by weight resin solids which were completely dissolved.

Example 10

(A) To a five-liter flask equipped with a stirrer was added 516.2 grams (3.56 equivalents) of a polymeric polyol of 5-oxatetracyclo[6.2.1.0$^{2,7}$.0$^{4,6}$]undecan-9-(10)-ol prepared in Example 1 having a hydroxyl equivalent weight of 145 indicating approximately 13 repeating unit, 1146 grams of soya acid (4.09 equivalents) and 150 grams of xylene. The amount of soya acid added represented a 15 percent excess of carboxyl groups based upon the hydroxyl equivalency of the polymer. The mixture was heated to 225° C. and maintained at this temperature for 6 hours under a nitrogen atmosphere. The reaction mixture appeared as a viscous yellowish liquid which upon titration with potassium hydroxide was found to have an acid number of 21.2 indicating that the esterification was substantially complete.

(B) The reaction mixture obtained above was then cooled to 80° C. and 139.6 grams of maleic anhydride (2.85 equivalents) were added. To prevent discoloration of the product 8.69 grams of diphenyl pentaerythritol diphosphite a stabilizer was added also. After the maleic anhydride had been completely dissolved, 1.74 grams of iodine were added. The reaction mixture was heated to 225° C. and held at this temperature for 2 hours.

(C) To the agitated ester polyol-carboxylic acid adduct at a temperature of 75° C. were added 278.9 grams of dimethyl ethanolamine (3.13 equivalents) in 185.2 grams of water. To the reaction product mixture there was then added 555.4 grams of propoxy propanol and 138.8 grams of butyl carbitol. Amidst additional stirring, 1327 grams of water were also added. The resulting solution contained about 38 percent by weight resin solids which were completely dissolved.

Example 11

(A) To a five-liter flask equipped with a stirrer was added 507.5 grams (3.50 equivalents) of a polymeric polyol of 5-oxatetracyclo[6.2.1.0$^{2,7}$.0$^{4,6}$]undecan-9(10)-ol prepared in Example 1 having a hydroxyl equivalent weight of 145 indicating approximately 13 repeating units, 1176 grams of soya acid (4.20 equivalents) and 150 grams of xylene. The amount of soya acid added represented a 20 percent excess of carboxyl groups based upon the hydroxyl equivalency of the polymer. The mixture was heated to 225° C. and maintained at this temperature for 6 hours under a nitrogen atmosphere. The reaction mixture appeared as a viscous yellowish liquid which upon titration with potassium hydroxide was found to have an acid number of 21.4 indicating that the esterification was substantially complete.

(B) The reaction mixture obtained above was then cooled to 80° C. and 120.3 grams of maleic anhydride (2.45 equivalents) were added. To prevent discoloration of the product 8.72 grams of diphenyl pentaerythritol diphosphite, a stabilizer was added also. After the maleic anhydride had been completely dissolved, 1.75 grams of iodine were added. The reaction mixture was heated to 225° C. and held at this temperature for 2 hours.

(C) To the agitated ester polyol-carboxylic acid adduct at a temperature of 75° C. were added 240.4 grams of dimethyl ethanolamine (2.70 equivalents) in 185.4 grams of water. To the reaction product mixture there was then added 556.3 grams of propoxy propanol and 139.1 grams of butyl carbitol. Amidst additional stirring, 1330 grams of water were also added. The resulting solution contained about 39 percent by weight resin solids which were completely dissolved.

Example 12

(A) To a five-liter flask equipped with a stirrer was added 527.8 grams (3.64 equivalents) of a polymeric polyol of 5-oxatetracyclo[6.2.1$^{2,7}$.0$^{4,6}$]undecan-9(10)-ol prepared in Example 1 having a hydroxyl equivalent weight of 145 indicating approximately 13 repeating units, 1121 grams of soya acid (4.00 equivalents) and 150 grams of xylene. The amount of soya acid added represented a 10 percent excess of carboxyl groups based upon the hydroxyl equivalency of the polymer. The mixture was heated to 225° C. and maintained at this temperature for 6 hours under a nitrogen atmosphere. The reaction mixture appeared as a viscous yellowish liquid which upon titration with potassium hydroxide was found to have an acid number of 16.3 indicating that the esterification was substantially complete.

(B) The reaction mixture obtained above was then cooled to 80° C. and 159.0 grams of maleic anhydride (3.24 equivalents) were added. To prevent discoloration of the product 8.7 grams of diphenyl pentaerythritol diphosphite, a stabilizer was added also. After the maleic anhydride had been completely dissolved, 1.74 grams of iodine were added. The reaction mixture was heated to 225° C. and held at this temperature for 2 hours.

(C) To the agitated ester polyol-carboxylic acid adduct at a temperature of 75° C. were added 317.7 grams of dimethyl ethanolamine (3.57 equivalents) in 185.6 grams of water. To the reaction product mixture there was then added 556.8 grams of propoxy propanol and 139.2 grams of butyl carbitol. Amidst additional stirring, 1330 grams of water were also added. The resulting solution contained about 39 percent by weight resin solids which were completely dissolved.

Example 13

(A) To a five-liter flask equipped with a stirrer was added 498.8 grams (3.44 equivalents) of a polymeric polyol of 5-oxatetracyclo[6.2.1.0$^{2,7}$.0$^{4,6}$]undecan-9(10)-ol prepared in Example 1 having a hydroxyl equivalent weight of 145 indicating approximately 13 repeating units, 1204 grams of soya acid (4.30 equivalents) and 150 grams of xylene. The amount of soya acid added represented a 25 percent excess of carboxyl groups based upon the hydroxyl equivalency of the polymer. The mixture was heated to 225° C. and maintained at this temperature for 7½ hours under a nitrogen atmosphere. The reaction mixture appeared as a viscous yellowish liquid which upon titration with potassium hydroxide was found to have an acid number of 27.5 indicating that the esterification was substantially complete.

(B) The reaction mixture obtained above was then cooled to 80° C. and 100.3 grams of maleic anhydride (2.05 equivalents) were added. To prevent discoloration of the product 8.7 grams of diphenyl pentaerythritol diphosphite a stabilizer was added also. After the maleic anhydride had been completely dissolved, 1.75 grams of iodine were added. The reaction mixture was heated to 225° C. and held at this temperature for 2 hours.

(C) To the agitated ester polyol-carboxylic acid adduct at a temperature of 75° C. were added 200.4 grams of dimethyl ethanolamine (2.25 equivalents) in 185.5 grams of water. To the reaction product mixture there was then added 556.5 grams of propoxy propanol and 139.1 grams of butyl carbitol. Amidst additional stirring, 1330 grams of water were also added. The resulting solution contained about 40 percent by weight resin solids which were completely dissolved.

Example 14

(A) To a five-liter flask equipped with a stirrer was added 486.8 grams (3.36 equivalents) of a polymeric polyol of 5-oxatetracyclo[6.2.1.0$^{2,7}$.0$^{4,6}$]undecan-9(10)-ol prepared in Example 1 having a hydroxyl equivalent weight of 145 indicating approximately 13 repeating units, 1175 grams of soya acid (4.20 equivalents) and 150 grams of xylene. The amount of soya acid added represented a 25 percent excess of carboxyl groups based upon the hydroxyl equivalency of the polymer. The mixture was heated to 225° C. and maintained at this temperature for 5 hours under a nitrogen atmosphere. The reaction mixture appeared as a viscous yellowish liquid which upon titration with potassium hydroxide was found to have an acid number of 29.0 indicating that the esterification was substantially complete.

(B) The reaction mixture obtained above was then cooled to 80° C. and 139 grams of maleic anhydride (2.84 equivalents) were added. To prevent discoloration of the product 8.7 grams of diphenyl pentaerythritol diphosphite a stabilizer was added also. After the maleic anhydride had been completely dissolved, 1.74 grams of iodine were added. The reaction mixture was heated to 225° C. and held at this temperature for 2 hours.

(C) To the agitated ester polyol-carboxylic acid adduct at a temperature of 75° were added 279.5 grams of dimethyl ethylanolamine (3.14 equivalents) in 185.5 grams of water. To the reaction product mixture there was then added 556.5 grams of propoxy propanol and 139.1 grams of butyl carbitol. Amidst additional stirring, 1330 grams of water were also added. The resulting solution contained about 37 percent by weight resin solids which were completely dissolved.

Example 15

(A) To a five-liter flask equipped with a stirrer was added 495.5 grams (3.42 equivalents) of a polymeric polyol of 5-oxatetracyclo[6.2.1.0$^{2,7}$.0$^{4,6}$]undecan-9(10)-ol prepared in Example 1 having a hydroxyl equivalent weight of 145 indicating approximately 13 repeating units, 1148 grams of soya acid (4.10 equivalents) and 150 grams of xylene. The amount of soya acid added represented a 20 percent excess of carboxyl groups based upon the hydroxyl equivalency of the polymer. The mixture was heated to 225° C. and maintained at this temperature for 6 hours under a nitrogen atmosphere. The reaction mixture appeared as a viscous yellowish liquid which upon titration with potassium hydroxide was found to have an acid number of 25 indicating that the esterification was substantially complete.

(B) The reaction mixture obtained above was then cooled to 80° C. and 158.9 grams of maleic anhydride (3.24 equivalents) were added. After the maleic anhydride had been completely dissolved, 1.74 grams of iodine were added. The reaction mixture was heated to 225° C. and held at this temperature for 2 hours.

(C) To the agitated ester polyol-carboxylic acid adduct at a temperature of 75° C. were added 317.5 grams of dimethyl ethanolamine (3.57 equivalents) in 185.5 grams of water. To the reaction product mixture there was then added 556.5 grams of propoxy propanol and 139.1 grams of butyl carbitol. Amidst additional stirring, 1330 grams of water were also added. The resulting solution contained about 39 percent by weight resin solids which were completely dissolved.

Example 16

(A) To a five-liter flask equipped with a stirrer was added 481.0 grams (3.32 equivalents) of a polymeric polyol of 5-oxatetracyclo[6.2.1.0$^{2,7}$.0$^{4,6}$]undecan-9(10)-ol prepared in Example 1 having a hydroxyl equivalent weight of 145 indicating approximately 13 repeating units, 1161 grams of soya acid (4.15 equivalents) of 150 grams of xylene. The amount of soya acid added represented a 25 percent excess of carboxyl groups based upon the hydroxyl equivalency of the polymer. The mixture was heated to 225° C. and maintained at this temperature for 6 hours under a nitrogen atmosphere. The reaction mixture appeared as a viscous yellowish liquid which upon titration with potassium hydroxide was found to have an acid number of 28.5 indicating that the esterification was substantially complete.

(B) The reaction mixture obtained above was then cooled to 80° C. and 158.9 grams of maleic anhydride (3.24 equivalents) were added. To prevent discoloration of the product 8.69 grams of diphenyl pentaerythritol diphosphite a stabilizer was added also. After the maleic anhydride had been completely dissolved, 1.73 grams of iodine were added. The reaction mixture was heated to 225° C. and held at this temperature for 2 hours.

(C) To the agitated ester polyol-carboxylic acid adduct at a temperature of 78° C. were added 317.5 grams of dimethyl ethanolamine (3.57 equivalents) in 185.5 grams of water. To the reaction product mixture there was then added 556.5 grams of propoxy propanol and 139.1 grams of butyl carbitol. Amidst additional stirring, 1330 grams of water were also added. The resulting solution contained about 37 percent by weight resin solids which were completely dissolved.

Example 17

(A) To a five-liter flask equipped with a stirrer were added 546 grams (3.76 equivalents) of a polymeric polyol of 5-oxatetracyclo[6.2.1.0$^{2,7}$.0$^{4,6}$]undecan-9(10)-ol prepared in Example 1 having a hydroxyl equivalent weight of 145 indicating approximately 13 repeating units, 1175 grams of soya acid (4.14 equivalents) and 150 grams of xylene. The amount of soya acid added represented a 10 percent excess of carboxyl groups based upon the hydroxyl equivalency of the polymer. The mixture was heated to 225° C. and maintained at this temperature for 7 hours under a nitrogen atmosphere. The reaction mixture appeared as a viscous yellowish liquid which upon titration with potassium hydroxide was found to have an acid number of 17.1 indicating that the esterification was substantially complete.

(B) The reaction mixture was obtained above was then cooled to 150° C. and to prevent discoloration of the product 8.7 grams of diphenyl pentaerythritol diphosphite a stabilizer was added. The temperature was raised to 225° C. and 86.6 grams of molten maleic anhydride (1.77 equivalents) were added. After the maleic anhydride was added, 1.73 grams of iodine in 20.0 grams of xylene were added. The reaction mixture was heated to 225° C. and held at this temperature for 2 hours until analyses by vapor phase chromatography reveals an absence of free maleic anhydride in the reaction mixture.

(C) To the agitated ester polyol-carboxylic acid adduct at a temperature of 75° C. were added 153 grams of dimethyl ethanolamine (1.72 equivalents) in 185.5 grams of water. To the reaction product mixture there was then added 556.5 grams of propoxy propanol and 139.1 grams of butyl carbitol. The resulting solution contained about 61.2 percent by weight resin solids which were completely dissolved.

Example 18

To a 100 gallon glass-lined autoclave equipped with a stirrer and a condenser and containing 3.86 pounds of water (0.2144 pound mole) and 186.3 pounds of dioxane at 45° C. was continuously added a solution of 288 pounds of 5-oxatetracyclo[6.2.1.0$^{2,7}$.0$^{4,6}$]undecan-9(10)-ol (1.735 pound moles) in 144 pounds of dioxane over a period of about 4.3 hours. Simultaneous there was added 5.76 pounds of boron trifluoride etherate catalyst and 22.5 pounds of dioxane over a period of about 5.4 hours. The water present was 26.1 percent in excess of that theoretically required to produce a polymer having 10.20 repeating units. Following the addition of catalyst, the solution was heated to 50° C. for about 4 hours. There was obtained following heating, a viscous amber liquid solution which when tested was found to contain less than 1.0 percent unreacted 5-oxatetracyclo[6.2.1.0$^{2,7}$.0$^{4,6}$]undecan-9(10)-ol based upon the charge. To this solution was added 36 pounds of calcium hydroxide and 75 pounds of water to separate the catalyst from polymer. The mixture was then heated for 4 hours at 50° C. for 16 additional hours and at 90° C. The solution was filtered to remove insoluble borate and fluoride salts formed by the calcium hydroxide addition and to remove the residual calcium hydroxide. The resulting solution contained 42.52 percent by weight of a polymerization product having a hydroxyl equivalent weight of 140.26 which corresponded to a polymer having 10.20 repeating units. The solution demonstrated a Gardner color value of 4 and a Brookfield viscosity of 255 centipoises at about 25° C.

Example 19

(A) To a five-liter flask equipped with a stirrer were added 423 grams (3.016 equivalents) of a polymeric polyol of 5-oxatetracyclo[6.2.1.0$^{2,7}$.0$^{4,6}$]undecan-9(10)-ol prepared in Example 18 having a hydroxyl equivalent weight of 140.26 indicating approximately 10 repeating units, 650 grams of soya acid (2.316 equivalents), 350 grams of safflower acid (1.228 equivalents), and 100 grams of xylene. The total amount of fatty acid added represented a 17.5 percent excess of carboxyl groups based upon the hydroxyl equivalency of the polymer. The mixture was heated to 225° C. and maintained at this temperature for 5.5 hours under a nitrogen atmosphere. The reaction mixture appeared as a viscous yellowish liquid which upon titration with potassium hydroxide was found to have an acid number of 22.8 indicating that the esterification was substantially complete.

(B) The reaction mixture obtained above was then cooled to 150° C. and 96 grams of maleic anhydride (1.957 equivalents) were added. To prevent discoloration of the product 7.3 grams of diphenylpentaerythritol diphosphite, a stabilizer was added also. After the maleic anhydride had been completely dissolved, 1.46 grams of iodine in 14.6 grams of xylene were added. The reaction mixture was heated to 225° C. and held at this temperature for 1.5 hours until analyses by vapor phase chromatography revealed an absence of free maleic anhydride in the reaction mixture. Titration of the reaction product mixture with benzyl trimethyl ammonium hydroxide revealed the adduct had an acid number of 75.8.

(C) To the agitated ester polyol-carboxylic acid adduct at a temperature of 75° C. were added 169.5 grams of dimethylethanol amine (1.9 equivalents) in 155.3 grams of water. To the reaction product mixture there was then added 465.9 grams of n-propoxypropanol and 116.5 grams of butyl carbitol. Amine number of the amine modified ester polyol-carboxylic acid was determined to be 80.5 by titration with perchloric acid, indicating complete neutralization of substantially all of the acid character. Amidst additional stirring, 1113.4 grams of water were also added. The resulting solution contained about 39 percent by weight resin solids which were completely dissolved.

Example 20

(A) To a five-liter flask equipped with a stirrer were added 422 grams (3.009 equivalents) of a polymeric polyol of 5-oxatetracyclo[6.2.1.0$^{2,7}$.0$^{4,6}$]undecan-9(10)-ol prepared in Example 18 having a hydroxyl equivalent weight of 140.26 indicating approximately 10 repeating units, 500 grams of soya acid (1.782 equivalents), 500 grams of safflower acid (1.754 equivalents), and 100 grams of xylene. The total amount of fatty acid added represented a 17.5 percent excess of carboxyl groups based upon the hydroxyl equivalency of the polymer. The mixture was heated to 225° C. and maintained at this temperature for 5 hours under a nitrogen atmosphere. The reaction mixture appeared as a viscous yellowish liquid which upon titration with potassium hydroxide was found to have an acid number of 22.6 indicating that the esterification was substantially complete.

(B) The reaction mixture obtained above was then cooled to 150° C. and 96 grams of maleic anhydride (1.957 equivalents) were added. To prevent discoloration of the product 7.3 grams of diphenylpentaerythritol diphosphite, a stabilizer was added also. After the maleic anhydride had been completely dissolved, 1.46 grams of iodine in 14.6 grams of xylene were added. The reaction mixture was heated to 225° C. and held at this temperature for 1.5 hours until analyses by vapor phase chromatography revealed an absence of free maleic anhydride in the reaction mixture. Titartion of the reaction product mixture with benzyl trimethyl ammonium hydroxide revealed the adduct had an acid number of 79.8.

(C) To the agitated ester polyol-carboxylic acid adduct at a temperature of 80° C. were added 182.4 grams of dimethylethanol amine (2.05 equivalents) in 155.2 grams of water. To the reaction product mixture there was then added 465.6 grams of n-propoxypropanol and 116.4 grams of butyl carbitol. Amine number of the amine modified ester polyol-carboxylic acid was determined to be 85.8 by titration with perchloric acid, indicating complete neutralization of substantially all of the acid character. Amidst additional stirring, 1112.6 grams of water were also added. The resulting solution contained about 39 percent by weight resin solids which were completely dissolved.

Example 21

(A) To a five-liter flask equipped with a stirrer were added 424 grams (3.024 equivalents) of a polymeric polyol of 5-oxatetracyclo[6.2.1.0$^{2,7}$.0$^{4,6}$]undecan-9(10)-ol prepared in Example 18 having a hydroxyl equivalent weight of 140.26 indicating approximately 10 repeating units, 800 grams of soya acid (2.851 equivalents), 200 grams of safflower acid (.702 equivalent), and 100 grams of xylene. The total amount of fatty acid added represented a 17.5 percent excess of carboxyl groups based upon the hydroxyl equivalency of the polymer. The mixture was heated to 225° C. and maintained at this temperature for 5 hours under a nitrogen atmosphere. The reaction mixture appeared as a viscous yellowish liquid which upon titration with potassium hydroxide was found to have an acid number of 22.7 indicating that the esterification was substantially complete.

(B) The reaction mixture obtained above was then cooled to 150° C. and 96 grams of maleic anhydride (1.957 equivalents) were added. To prevent discoloration of the product 7.3 grams of diphenylpentaerythritol diphosphite, a stabilizer was added also. After the maleic anhydride had been completely dissolved, 1.46 grams of iodine in 14.6 grams of xylene were added. The reaction mixture was heated to 225° C. and held at this temperature for 1.5 hours until analyses by vapor phase chromatography revealed an absence of free maleic anhydride in the reaction mixture. Titration of the reaction product mixture with benzyl trimethyl ammonium hydroxide revealed the adduct had an acid number of 73.6.

(C) To the agitated ester polyol-carboxylic acid adduct at a temperature of 90° C. were added 169.6 grams of dimethylethanol amine (1.9 equivalents) in 155.4 grams of water. To the reaction product mixture there was then added 466.2 grams of n-propoxypropanol and 116.5 grams of butyl carbitol. Amine number of the amine modified ester polyol-carboxylic acid was determined to be 79.3 by titration with perchloric acid, indicating complete neutralization of substantially all of the acid character. Amidst additional stirring, 1114.2 grams of water were also added. The resulting solution contained about 39 percent by weight resin solids which were completely dissolved.

Example 22

(A) To a five-liter flask equipped with a stirrer were added 421 grams (3.0 equivalents) of a polymeric polyol of 5 - oxatetracyclo[6.2.1.0$^{2,7}$.0$^{4,6}$]undecan - 9(10)-ol prepared in Example 18 having a hydroxyl equivalent weight of 140.26 indicating approximately 10 repeating units, 1017 grams of soya acid (3.525 equivalents) and 100 grams of xylene. The amount of soya acid added represented a 17.5 percent excess of carboxyl groups based upon the hydroxyl equivalency of the polymer. The mixture was heated to 225° C. and maintained at this temperature for 7.75 hours under a nitrogen atmosphere. The reaction mixture appeared as a viscous brown liquid which upon titration with potassium hydroxide was found to have an acid number of 22.4 indicating that the esterification was substantially complete.

(B) The reaction mixture obtained above was then cooled to 142° C. and 97 grams of maleic anhydride (1.98 equivalents) were added. To prevent discoloration of the product 7.4 grams of diphenylpentaerythritol diphosphite, a stabilizer was added also. After the maleic anhydride had been completely dissolved, 1.48 grams of iodine in 14.8 grams of xylene were added. The reaction mixture was heated to 225° C. and held at this temperature for 2 hours until analyses by vapor phase chromatography revealed an absence of free maleic anhydride in the reaction mixture. Titration of the reaction product mixture with benzyl trimethyl ammonium hydroxide revealed the adduct had an acid number of 64.2.

(C) To the agitated ester polyol-carboxylic acid adduct at a temperature of 85° C. were added 145 grams of dimethylethanol amine (1.63 equivalents) in 157 grams of water. To the reaction product mixture there was then added 296 grams of n-propoxypropanol and 118.5 grams of butyl carbitol. Amine number of the amine modified ester polyol-carboxylic acid was determined to be 64.95 by titration with perchloric acid, indicating complete neutralization of substantially all of the acid character. The resulting solution contained about 62.65 percent by weight resin solids which were completely dissolved.

Example 23

(A) To a five-liter flask equipped with a stirrer were added 421 grams (3.0 equivalents) of a polymeric polyol of 5 - oxatetracyclo[6.2.1.0$^{2,7}$.0$^{4,6}$]undecan-9(10) - ol prepared in Example 18 having a hydroxyl equivalent weight of 140.26 indicating approximately 10 repeating units 952 grams of soya acid (3.3 equivalents) and 100 grams of xylene. The amount of soya acid added represented a 10 percent excess of carboxyl groups based upon the hydroxyl equivalency of the polymer. The mixture was heated to 225° C. and maintained at this temperature for 7.5 hours under a nitrogen atmosphere. The reaction mixture appeared as a viscous brown liquid which upon titration with potassium hydroxide was found to have an acid number of 16.4 indicating that the esterification was substantially complete.

(B) The reaction mixture obtained above was then cooled to 145° C. and 73 grams of maleic anhydride (1.49 equivalents) were added. To prevent discoloration of the product 6.96 grams of diphenylpentaerythritol diphosphite, a stabilizer was added also. After the maleic anhydride had been completely dissolved, 1.39 grams of iodine in 13.9 grams of xylene were added. The reaction mixture was heated to 225° C. and held at this temperature for 2 hours until analyses by vapor phase chromatography revealed an absence of free maleic anhydride in the reaction mixture. Titration of the reaction product mixture with benzyl trimethyl ammonium hydroxide revealed the adduct had an acid number of 48.2.

(C) To the agitated ester polyol-carboxylic acid adduct at a temperature of 90° C. were added 99 grams of dimethylethanol amine (1.11 equivalents) in 147.6 grams of water. To the reaction product mixture there was then added 278 grams of n-propoxypropanol and 111 grams of butyl carbitol. Amine number of the amine modified ester polyol-carboxylic acid was determined to be 47.4 by titration with perchloric acid, indicating complete neutralization of substantially all of the acid character. The resulting solution contained about 64.7 percent by weight resin solids which were completely dissolved.

In a similar manner suitable water reducible resin vehicles may be prepared utilizing polycyclic polyether polyols polymerized from other monomers within the scope of this invention. Exemplary preparative procedures are set forth in the following examples.

Example 24

To a five liter flask equipped with a stirrer are added 622 grams (4.0 equivalents) of a polymeric polyol of 5 - oxatetracyclo[6.2.1.0$^{2,7}$.0$^{4,6}$]undecan - 9(10)methanol polymerized in a manner analogous to that of Example 18 employing water as a chain length modifier in a molar ratio of about 12 moles of monomer to about 1.25 moles of water so that such polymeric polyol contains an average of about 12 repeating units. Also added are 1144 grams of soya fatty acids (4.08 equivalents) representing about a 2 percent excess of carboxyl groups based upon the hydroxyl equivalency of the polymer. The mixture is heated at 225° C. until the acid number of the mixture reaches a constant minimum.

(B) The reaction mixture is then cooled to 180° C. and 112.0 grams of maleic anhydride (2.28 equivalents) are added which is about that required to bring the acid number of the polyester to 70. To prevent discoloration a small amount of diphenylpentaerythritol diphosphite a phosphite stabilizer are also added. After the maleic anhydride has completely dissolved, 1.5 grams of iodine in 15 grams of xylene are added. The mixture is heated to 225° C. until analysis of the mixture reveals an absence of maleic anhydride.

(C) To the agitated ester polyol-carboxylic acid adduct at a temperature of 90° C. is added sufficient triethylamine dissolved in 200 grams of water to neutralize the resin mixture. To the reaction mixture there is then added 640 grams of n-propoxypropanol. The resulting mixture may be diluted with water to a solution containing about 40% resin solids, the resin solids remaining dissolved.

Example 25

To a five liter flask equipped with a stirrer are added 585 grams (6.0 equivalents) of a polymeric polyol of 10-oxapentacyclo[6.3.1.1$^{3,6}$.0$^{2,7}$.0$^{9,11}$]tridecane - 4,5 - diol polymerized in a manner analogous to that of Example 18 employing water as a chain length modifier in a molar ratio of about 13 moles of monomer to about 1.25 moles of water so that such polymeric polyol contains an average of about 13 repeating units. Also added are 1740 grams of soya fatty acids (6.2 equivalents) representing about a 3 percent excess of carboxyl groups based upon the hydroxyl equivalency of the polymer. The mixture is heated at 225° C. until the acid number of the mixture reaches a constant minimum.

(B) The reaction mixture is then cooled to 180° C. and 85.5 grams of fumaric acid (1.75 equivalents) are added which is about that required to bring the acid number of the polyester to 45. To prevent discoloration a small amount of diphenylpentaerythritol diphosphite a phosphite stabilizer are also added. After the fumaric acid has completely dissolved, 1.1 grams of iodine in 11 grams of xylene are added. The mixture is heated at 225° C. until analysis of the mixture reveals an absence of furmaric acid.

(C) To the agitated ester polyol-carboxylic acid adduct at a temperature of 90° C. is added sufficient piperidine dissolved in 263 grams of water to neutralize the resin mixture. To the reaction mixture there is then added 530 grams of in-butoxypropanol and 200 grams of butyl carbitol. The resulting mixture may be diluted with water to a solution containing about 40% resin solids, the resin solids remaining dissolved.

Example 26

(A) To a five liter flask equipped with a stirrer are added 756 grams (4.6 equivalents) of a polymeric polyol of 10-oxatetracyclo[6.3.1.1$^{3,6}$.0$^{2,7}$.0$^{9,11}$]tridecan - 4(5) - ol polymerized in a manner analogous to that of Example 18 employing water as a chain length modifier in a molar ratio of about 12 moles of monomer to about 1.25 moles of water so that such polymeric polyol contains an average of about 12 repeating units. Also added are 1460 grams of tall oil fatty acids (5.1 equivalents) representing about 11 percent excess of carboxyl groups based upon the hydroxyl equivalency of the polymer. The mixture is heated at 225° C. until the acid number of the mixture reaches a constant minimum.

(B) The reaction mixture is then cooled to 180° C. and 136.5 grams of glutaconic acid (2.1 equivalents) are added which is about that required to bring the acid number of the polyester to 50. To prevent discoloration a small amount of diphenylpentaerythritol diphosphite, a phosphite stabilizer, is also added. After the glutaconic acid has completely dissolved, 1.5 grams of iodine in 15 grams of xylene are added. The mixture is heated to 225° C. until analysis of the mixture reveals an absence of glutaconic acid.

(C) To the agitated ester polyol-carboxylic acid adduct at a temperature of 90° C. is added sufficient N,N-dimethylethanol amine to neutralize the resin mixture, said amine dissolved in about 250 grams of water. To the reaction mixture there is then added 540 grams of n-propoxypropanol and 214 grams of butyl carbitol. The resulting mixture may be diluted with water to a solution containing about 40% resin solids, the resin solids remaining dissolved.

Example 27

To a five liter flask equipped with a stirrer are added 341 grams (4.0 equivalents) of a polymeric polyol of 5-oxatetracyclo[6.2.1.0$^{2,7}$.0$^{4,6}$]undecan - 9,10 - diol polymerized in a manner analogous to that of Example 18 employing water as a chain length modifier in a molar ratio of about 12 moles of monomer to about 1.25 moles of water so that such polymeric polyol contains an average of about 12 repeating units. Also added are 930 grams of soya fatty acids (3.31 equivalents) representing about stoichiometric equivalence of carboxyl groups based upon the hydroxyl equivalency of the polymer. The mixture is heated at 225° C. until the acid number of the mixture reaches a constant minimum.

(B) The reaction mixture is then cooled to 180° C. and 95.0 grams of ethylidene malonic acid (1.46 equivalents) are added which is about that required to bring the acid number of the polyester to 60. To prevent discoloration a small amount of diphenylpentaerythritol diphosphite, a phosphite stabilizer are also added. After the ethylidene malonic acid has completely dissolved, 1 gram of iodine in 10 grams of xylene are added. The mixture is heated to 225° C. until analysis of the mixture reveals an absence of ethylidene malonic acid.

(C) To the agitated ester polyol-carboxylic acid adduct at a temperature of 90° C. is added sufficient N-methylmorpholine to neutralize the resin mixture, said amine dissolved in about 140 grams of water. To the reaction mixture there is then added 310 grams of n-propoxypropanol and 115 grams of butyl carbitol. The resulting mixture may be diluted with water to a solution containing about 40% resin solids, the resin solids remaining dissolved.

Example 28

(A) To a five liter flask equipped with a stirrer are added 622 grams (4.0 equivalents) of a polymeric polyol of 5-oxatetracyclo[7.2.1.0$^{2,8}$.0$^{4,6}$]dodecan-10(11)-ol polymerized in a manner analogous to that of Example 18 employing water as a chain length modifier in a molar ratio of about 12 moles of monomer to about 1.25 moles of water so that such polymeric polyol contains an average of about 12 repeating units. Also added are 1260 grams of tall oil fatty acids (4.4 equivalents) representing about a 10 percent excess of carboxyl groups based upon the hydroxyl equivalency of the polymer. The mixture is heated at 225° C. until the acid number of the mixture reaches a constant minimum.

(B) The reaction mixture is then cooled to 180° C. and 105 grams of itaconic acid (1.62 equivalents) are added which is about that required to bring the acid number of the polyester to 56. To prevent discoloration a small amount of diphenylpentaerythritol diphosphite, a phosphite stabilizer, are also added. After the itaconic acid has completely dissolved, 1.5 grams of iodine in 15 grams of xylene are added. The mixture is heated to 225° C. until analysis of the mixture reveals an absence of itaconic acid.

(C) To the agitated ester polyol-carboxylic acid adduct at a temperature of 90° C. is added sufficient morpholine in 213 grams of water to neutralize the resin mixture. To the reaction mixture there is then added 630 grams of n-propoxypropanol. The resulting mixture may be diluted with water to a solution containing about 40% resin solids, the resin solids remaining dissolved.

Example 29

(A) To a five liter flask equipped with a stirrer are added 537 grams (3.0 equivalents) of a polymeric polyol of 5-oxatetracyclo[$6.2.1.0^{2,7}.0^{4,6}$]undec-9(10)-oxyethanol polymerized in a manner analogous to that of Example 18 employing water as a chain length modifier in a molar ratio of about 11 moles of monomer to about 1.25 moles of water so that such polymeric polyol contains an average of about 11 repeating units. Also added are 855 grams of safflower acid (3.0 equivalents) representing about stoichiometric equivalence of carboxyl groups based upon the hydroxyl equivalency of the polymer. The mixture is heated at 225° C. until the acid number of the mixture reaches a constant minimum.

(B) The reaction mixture is then cooled to 180° C. and 90.8 grams of maleic anhydride (1.85 equivalents) are added which is about that required to bring the acid number of the polyester to 70. To prevent discoloration a small amount of diphenylpentaerythritol diphosphite, a phosphite stabilizer, are also added. After the maleic anhydride has completely dissolved, 1.2 grams of iodine in 12 grams of xylene are added. The mixture is heated to 225° C. until analysis of the mixture reveals an absence of maleic anhydride.

(C) To the agitated ester polyol-carboxylic acid adduct at a temperature of 90° C. is added sufficient triethylamine dissolved in 159 grams of water to neutralize the resin mixture. To the reaction mixture there is then added 330 grams of n-propoxypropanol and 120 grams of butyl carbitol. The resulting mixture may be diluted with water to a solution containing about 40% resin solids, the resin solids remaining dissolved.

In the foregoing specification and in the examples the position of hydroxyl groups of a monomer employed is designated as to include both two position isomers. Accordingly the designation 5-oxatetracyclo[$6.2.1.0^{2,7}.0^{4,6}$] undecan-9(10)-ol indicates that a monohydroxy compound is contemplated, the hydroxyl group being at either the 9 or the 10 position.

The solutions containing approximately 40 percent resin solids as prepared in the foregoing examples were subjected to various tests to determine their water compatibility and their film forming properties when applied as a coating. The tests were carried out as follows:

(A) *30 percent water tolerance.*—An amount of solution prepared in the designated example containing 4.0 grams of resin solids was diluted with water to produce a solution having a total weight of 13.33 grams of 30 percent by weight resin solids. Where necessary the solution was placed on a roll and a single continuous liquid phase was formed. The solution was examined for clarity and was considered to pass the test if ruled lines about ½ inch apart could be seen through the solution in a 125 millimeter Erlenmeyer flask.

(B) *5 percent water tolerance.*—An amount of solution prepared in the designated example containing 1.25 grams of resin solids was diluted with water to produce a solution having a total weight of 25 grams. The solution was examined for clarity using the same criterion as the 30 percent water tolerance test above.

(C) *Cloud point.*—Solutions which passed the 30 percent water tolerance test were slowly diluted with water until clouding of the solution began to appear as a result of the resin coming out of solution. The cloud point is represented as the percent of resin solids in the solution at which the clouding commences.

(D) *Drying time.*—To determine drying time the vehicles were cast with a doctor blade to form films 4 mils thick. The film was deemed set to touch when none of the film adhered to the finger following touch. A film which dried until paper free did not produce any noise when a strip of paper pressed onto the film was removed. These tests are encompassed in Federal Test Method Standard Nos. 141 and 4061.

Results are tabulated in Table I below.

TABLE I.—PHYSICAL PROPERTIES OF COATINGS

| | pH | | | Water Tolerance at Room Temperature | | | | Cloud Point After 7 Days, Percent Solids | Drying Time [1] | | Hardness [2] Sward Values |
|---|---|---|---|---|---|---|---|---|---|---|---|
| | Initial | at 140° F. | | 1 Day | | 7 Days | | | Set to Touch | Paper Free | |
| | | 7 days | 14 days | 5% | 30% | 5% | 30% | | | | |
| Example No.: | | | | | | | | | | | |
| 2 | | 8.75 | 8.65 | Yes | Yes | Yes | Yes | 29 | 7 | 47 | 4 |
| 3 | 9.45 | 9.0 | 9.0 | Yes | No | Yes | No | 30 | 11 | 72 | 4 |
| 4 | 9.55 | 9.2 | 9.15 | Yes | Yes | Yes | Yes | 30 | 11 | 24 | 8 |
| 5 | 9.2 | 8.9 | 8.85 | Yes | Yes | Yes | Yes | 3.5 | 7 | 24 | 4 |
| 6 | 9.1 | 8.55 | 8.55 | Yes | No | Yes | Yes | 3.5 | 7 | 72–168 | 4 |
| 7 | 9.45 | 9.4 | 9.4 | No | Yes | No | Yes | 12.5 | 12 | 120 | 4 |
| 8 | 9.5 | 9.2 | 9.2 | No | Yes | No | Yes | 30 | 9 | 24–72 | 4 |
| 9 | 9.55 | 8.75 | 8.75 | Yes | Yes | Yes | Yes | 3.5 | 7 | 25 | 6 |
| 10 | 9.35 | 9.0 | 8.45 | Yes | Yes | No | Yes | 3.5 | 7 | 25 | 6 |
| 11 | 9.2 | 8.8 | 8.8 | Yes | Yes | No | Yes | 22 | 7 | 24.5 | 6 |
| 12 | 9.6 | 9.4 | 9.35 | Yes | Yes | No | Yes | 25 | 7 | 24 | 4 |
| 13 | 9.0 | 8.4 | 8.25 | Yes | Yes | Yes | Yes | [3] 3.5 | 5 | 24–72 | 4 |
| 14 | 9.3 | 9.1 | 9.0 | Yes | Yes | Yes | Yes | 4.1 | 6.5 | 130 | 4 |
| 15 | 9.35 | 9.25 | 9.1 | Yes | Yes | Yes | Yes | 3.5 | 6.5 | 130 | 6 |
| 16 | 9.3 | 9.15 | 9.0 | Yes | Yes | Yes | Yes | 4.5 | 6.5 | 126–140 | 4 |
| 19 | 9.05 | 8.5 | 8.25 | Yes | Yes | Yes | Yes | 3.5 | 3 | 7 | 4 |
| 20 | 9.25 | 8.75 | 8.55 | Yes | Yes | Yes | Yes | 3.5 | 3 | 5.5 | 4 |
| 21 | 9.10 | 8.40 | 8.80 | Yes | Yes | Yes | Yes | 3.5 | 3 | 5.5 | 2 |

[1] Drying times and pH were determined using vehicle containing 0.11 percent by weight of resin solids of a water dispersable cobalt drier marketed by NUODEX Products Company under the name Cyclodex 5.0% cobalt.
[2] Hardness values determined with Sward Rocker on steel panels after 7 days at room temperature.
[3] Cloud Pt. determined after 14 days at room temperature.

To test the above prepared vehicles as finished paint formulations, high gloss water based enamel paints were prepared from the above vehicles using the following procedure.

250 grams of the vehicles containing approximately 40 percent resin solids prepared in the above examples were ground with 250 grams of rutile titanium dioxide. Grinding was accomplished by one pass on a 3 roll mill. To the pigmented vehicle was added about 362 grams of additional vehicle containing approximately 40 percent resin solids, premixed with 4.5 grams of the cobalt drier used in Table I above. The mixture was diluted with about 292 grams of water and stirred until uniform.

Following determination of pH and Stormer viscosity, in Krebs units the paint compositions thus prepared were cast with a doctor blade to form films having a 7 mil wet film thickness. The films were subjected to the following tests. Results are tabulated in Table I.

*pH.*—The pH of the paint formulation was determined initially (after 1 day) and after 30 days at 125° F. The stability of the vehicles of this invention and their resistance to hydrolysis which would cause a lowering of pH is amply illustrated even under the severe testing conditions employed.

*Drying time.*—Touch and paper drying time determined as described above in Table I. Time is recorded in hours. Tests were run 1 day after formulation of the paint, and after the formulated paint stood at room temperature for 30 days.

*Scrub resistance.*—Scrub resistance tests were run after the film was dried for 3 days at 78° F. and 50 percent relative humidity using a Gardner Straight Line Washability Machine having a bristle brush with a total weight of one pound. An alkaline solution of 2 percent trisodium phosphite in water was employed. Both the forward and return portion of the brush cycle were counted as one stroke. The test was terminated after 1500 strokes if no erosion of the film was observed, or at the number of strokes at which film failure occurred.

*Adhesion.*—Wet adhesion was measured as the adhesion of the film to a glossy surface under moist conditions and was determined by laying the test film over a commercially available high gloss enamel. After drying of the test film a razor slit in the film was made and the film was soaked in water for 30 minutes. The film was then subjected to scrubbing with water on the Gardner Straight Line Washability Machine. Erosion or peeling, if any, at the slit was noted after 5000 strokes. Sooner failure of the film is noted at the stroke when failure occurred.

Dry adhesion was measured as adhesion to a glossy surface under normal conditions. The test film was laid over the high gloss enamel as in the wet adhesion test. After drying a multiplicity of crosshatched slits were made in the film with razor blades outlining scarified squares in the film. A plastic tape was pressed firmly on the film and pulled away sharply. The percent of scarified squares not removed by the tape was taken as a measure of dry adhesion.

*Gloss.*—Gloss of the paints was determined using a Gardner Glossmeter having a 60° Specular Gloss Exposure Head. Gloss readings are based optimally on 100. Readings were taken of each sample 1 day after drying and 14 days after drying.

*Hardness.*—Hardness readings were taken 3 days and 30 days after application using a Sward rocker on glass panels.

In the following Table II the values obtained for the above tests are tabulated.

What is claimed is:

1. An ester polyol-carboxylic acid adduct having pendant carboxyl groups and having an acid number of at least 35 which comprises the adduction product of an admixture containing (1) at least one compound selected from the group consisting of $\alpha,\beta$-ethylenically unsaturated polycarboxylic acids and anhydrides, and (2) a polyester having an acid number less than 20 containing less than 20 percent by weight oxygen, said polyester obtained by reacting an admixture containing (a) a liquid to fusible solid polycyclic polyether polyol obtained by polymerizing a polycarbocyclic compound identified by a polycarbocyclic ring structure selected from the group consisting of the bicyclo[2.2.1]heptanoid ring and fused homocarbocyclic ring systems of which at least one bicyclo[2.2.1]heptanoid ring is an integral part, said polycarbocyclic compound containing one cyclic vicinal epoxy group whose vicinal carbon atoms form part of the polycarbocyclic ring structure and at least one hydroxyl group, the said polycyclic polyether polyol containing an average of at least about 8 repeating units and an average of at least about one hydroxyl group per repeating unit, and (b) an unsaturated monocarboxylic compound selected from the group consisting of unsaturated fatty acids and oils, said monocarboxylic acid being present in sufficient relative amount as to provide at least 0.9 carboxyl equivalents per hydroxyl equivalent of said polycyclic polyether polyol.

2. An ester polyol-carboxylic acid adduct having pendant carboxylic groups and having an acid number of at least 35 which comprises the adduction product of an admixture containing (1) at least one compound selected from the group consisting of $\alpha,\beta$-ethylenically unsaturated polycarboxylic acids and anhydrides, and (2) a polyester having an acid number less than 20 containing less than 20 percent by weight oxygen, said polyester obtained by reacting an admixture containing (a) a polycyclic polyether polyol obtained by polymerizing a polycarbocyclic compound identified by a polycarbocyclic ring structure containing 2 to 6 carbocycles selected from the group consisting of the bicyclo[2.2.1]-heptanoid ring and fused homocarbocyclic ring systems of which at least one bicyclo [2.2.1]heptanoid ring is integral part, said polycarbocyclic compound containing one vicinal epoxy group whose vicinal carbon atoms form part of the polycarbocyclic ring structure and at least one hydroxyl group, the said polycyclic polyether polyol containing from about 8 to about 25 repeating units, and an average of at least about one hydroxyl group per repeating unit, and (b) an unsaturated monocarboxylic compound selected from the group consisting of unsaturated fatty acids and oils, said monocarboxylic acid being present in sufficient relative amount as to

TABLE II.—PAINT PROPERTIES

| | pH | | Stormer Visc., K.U. | Drying Time | | | | Scrub Resist | Adhesion | | Sward Hard. | | 60° Gloss | |
| | | | | Initial | | 30 days at R.T. | | | | | | | | |
| | Initial | 30 days 125° F. | | Touch | Paper Free | Touch | Paper Free | | Wet | Dry, percent | 3 days | 30 days | 1 days | 14 days |
|---|---|---|---|---|---|---|---|---|---|---|---|---|---|---|
| Example: | | | | | | | | | | | | | | |
| Paint A [1] | 9.0 | 8.05 | 91 | 7 | 72–96 | 6¾ | 72 | 1,500 | [3] 3,850 | 95–99 | 4 | 6 | 98 | 97 |
| Paint B [2] | | | 75 | 3 | 4½ | 3¾ | 5¼ | 1,500 | [4] 5,000 | 100 | 8 | 13 | 88 | 74 |
| 2 | 0.0 | 8.5 | 57 | 4½ | 24 | 5 | 12 | 1,500 | 5,000 | 53 | 8 | 12 | 86 | 73 |
| 3 | 9.0 | 8.6 | 70 | 7¼ | 8.23 | 4¼ | 7¼ | 1,500 | 5,000 | 62 | 10 | 13 | 94 | 88 |
| 4 | 9.2 | 8.8 | 88 | 6 | 8.23 | 5¾ | 10¼ | 1,500 | [4] 5,000 | 99 | 12 | 15 | 93 | 89 |
| 5 | 8.9 | 8.4 | 72 | 5 | 9 | 4 | 9¾ | 1,500 | [5] 5,000 | 96 | 7 | 9 | 95 | 87 |
| 6 | 8.95 | 8.5 | 62 | 4¾ | 9½ | 4 | 12½ | 1,500 | 5,000 | 75 | 4 | 8 | 86 | 77 |
| 9 | 8.9 | 8.4 | 63 | 3½ | 5–8 | 4½ | 7–22½ | 1,500 | [6] 5,000 | 100 | 6 | 10 | 87 | 81 |
| 10 | 9.1 | 8.5 | 76 | 4½ | 5–8 | 4½ | 7–22½ | 1,500 | [4] 5,000 | 99 | 6 | 12 | 93 | 89 |
| 11 | 8.9 | 8.5 | 72 | 5 | 7¾ | 4½ | 7–22½ | 1,500 | 500 | 99 | 8 | 10 | 92 | 88 |
| 12 | 9.25 | 8.8 | 83 | 5½ | 8–24 | 5½ | 10¼ | 1,500 | [6] 5,000 | 98 | 11 | 15 | 92 | 87 |
| 13 | 8.5 | 8.0 | 61 | 4½ | 13½ | 4¼ | 12–20 | 1,500 | 5,000 | 98 | 5 | 11 | 89 | 85 |
| 14 | 8.0 | 8.6 | 67 | 4¾ | 6½ | 4½ | 18 | 1,500 | 5,000 | 99 | 6 | 12 | 91 | 88 |
| 15 | 9.1 | 8.7 | 64 | 4½ | 6¾ | 4 | 5½ | 1,500 | [7] 5,000 | 99 | 6 | 12 | 92 | 89 |
| 16 | 8.0 | 8.6 | 67 | 6 | 11½ | 4 | 18 | 1,500 | [4] 5,000 | 98 | 6 | 11 | 90 | 89 |
| 17 | 9.3 | 9.1 | 61 | 5 | 12 | | | 1,500 | [3] 5,000 | 75 | 9 | | 77 | 76 |

[1] High gloss enamel formulated from a commercially available water compatible vehicle using same formulation as employed for vehicles of examples.
[2] Commercially available high gloss oil based enamel. [3] Peel. [4] Slow erosion. [5] Very slow erosion. [6] Erosion. [7] Moderate erosion.

provide at least 0.9 carboxyl equivalents per hydroxyl equivalent of said polycyclic polyether polyol, and said polyester containing an excess of up to 0.25 carboxyl equivalent, based on the hydroxyl equivalency of said polycyclic polyether polyol of said unsaturated monocarboxylic acid.

3. An ester polyol-carboxylic acid adduct having pendant carboxyl groups and having an acid number of at least 35 which comprises the adduction product of an admixture containing (1) at least one compound selected from the group consisting of α,β-ethylenically unsaturated polycarboxylic acids and anhydrides, and (2) a polyester having an acid number of less than 20, containing less than 20 percent by weight oxygen, said polyester obtained by reacting an admixture containing (a) a polycyclic polyether polyol obtained by polymerizing a polycarbocyclic compound identified by a fused polycarbocyclic ring structure containing 3 to 4 carbocycles of which at least one bicyclo[2.2.1]heptanoid ring is an integral part, said polycarbocyclic compound containing one cyclic vicinal epoxy group whose carbon atoms form part of the polycarbocyclic ring structure and at least one hydroxyl group, said hydroxyl groups selected from the class consisting of hydroxyl groups bonded directly to said polycarbocyclic structure and hydroxyl groups bonded to said polycarbocyclic structure through alkylene, alkyleneoxy and poly(alkyleneoxy) groups, said polycyclic polyether polyol containing from about 8 to about 25 repeating units, and containing an average of at least about one hydroxyl group per repeating unit, and (b) an unsaturated monocarboxylic compound selected from the group consisting of unsaturated fatty acids and oils, said monocarboxylic acid being present in sufficient relative amount as to provide at least 0.9 carboxyl equivalents per hydroxyl equivalent of said polycyclic polyether polyol, said polyester containing an excess of up to 0.25 carboxyl equivalent, based on the hydroxyl equivalency of said polycyclic polyether polyol, of said unsaturated monocarboxylic compound.

4. An ester polyol-carboxylic acid adduct having pendant carboxyl groups and having an acid number of at least 35 which comprises the adduction product of an admixture containing (1) at least one compound selected from the group cosisting of α,β-ethylenically unsaturated polycarboxylic acids and anhydrides, and (2) a polyester having an acid number less than about 20, containing less than 20 percent by weight oxygen, said polyester obtained by reacting an admixture containing (a) polycyclic polyether polyol obtained by polymerizing a polyycarbocyclic compound identified by a fused polycarbocyclic ring structure having 3 to 4 carbocycles of which at least one bicyclo[2.2.1]heptanoid ring is an integral part, said polycarbocyclic compound containing at least one hydroxyl group directly to said polycarbocyclic structure and one vicinal epoxy group whose vicinal carbon atoms form part of said polycarbocyclic ring structure, said polyocyclic polyether polyol containing from about 8 to about 25 repeating units and containing an average of at least about one hydroxyl group per repeating unit, and (b) an unsaturated monocarboxylic compound selected from the group consisting of monocarboxylic acids and oils, said monocarboxylic acid being present in sufficient relative amount as to provide at least 0.9 carboxyl equivalents per hydroxyl equivalent of said polycarbocyclic compound, said polyester containing an excess of up to 0.25 carboxyl equivalent, based on the hydroxyl equivalency of said polycyclic polyether polyol, of said unsaturated monocarboxylic acid.

5. An ester polyol-carboxylic acid adduct having pendant carboxyl groups and having an acid number of at least 35, which comprises the adduction product of (1) at least one compound selected from the group consisting of α,β-ethylenically unsaturated polycarboxylic acids and anhydrides, and (2) a polyester having an acid number of less than about 20, containing less than 20 percent by weight oxygen, said polyester obtained by reacting an admixture containing (a) a polycyclic polyether polyol obtained by polymerizing a polycarbocyclic compound identified by a polycarbocyclic ring structure containing 3 to 4 carbocycles and from 5 to 6 carbon atoms per carbocycle of which at least one bicyclo [2.2.1]heptanoid ring is an integral part, said polycarbocyclic compound containing at least one hydroxyl group bonded directly to the polycarbocyclic ring and one vicinal epoxy group whose vicinal carbon atoms form part of said polycarbocyclic ring structure, said polycyclic polyether polyol containing from about 10 to about 16 repeating units and containing an average of at least about one hydroxyl group per repeating unit, and (b) an unsaturated naturally occurring monocarboxylic acid having an iodine number of at least about 100, said monocarboxylic acid being present in sufficient relative amount as to provide 0.9 carboxyl equivalents per hydroxyl equivalent of said polycyclic polyether polyol, said polyester containing an excess of up to 0.25 carboxyl equivalent, based on the hydroxyl equivalency of said polycyclic polyether polyol, of said unsaturated monocarboxylic acid.

6. The adduct of claim 5 wherein the polycarbocyclic compound is 4 - oxatetracyclo[6.2.1.0$^{2,7}$.0$^{3,5}$]undecan-9(10)-ol.

7. The adduct of claim 5 wherein said polycarbocyclic compound is 4 - oxatetracyclo[6.2.1.0$^{2,7}$.0$^{3,5}$] undec-9(10)-oxyethanol.

8. An ester polyol-carboxylic acid adduct having pendant carboxyl groups and having an acid number of from about 40 to about 120 which comprises the adduction product of (1) maleic anhydride and (2) a polyester having an acid number less than about 20 containing less than 20 percent by weight oxygen, said polyester obtained by reacting an admixture containing (a) a polycyclic polyether polyol containing from about 8 to about 25 repeating units, and an average of at least about one hydroxyl group per repeating unit, obtained by polymerizing 4 - oxatetracyclo[6.2.1.0$^{2,7}$.0$^{3,5}$]undecan-9(10)-ol, and (b) a naturally occurring unsaturated monocarboxylic acid having an iodine number of at least about 100, said monocarboxylic acid being present in sufficient relative amount as to provide at least 0.9 carboxyl equivalents per hydroxyl equivalent of said polycyclic polyether polyol, said polyester containing an excess of up to 0.25 carboxyl equivalent, based on the hydroxyl equivalency of said polycyclic polyether polyol, of said unsaturated monocarboxylic acid.

9. A water compatible ester polyol-carboxylic acid adduct having pendant hydrophilic groups which comprises the reaction product of the ester polyol-carboxylic acid adduct of claim 1 and a water soluble cation under aqueous conditions.

10. A water compatible ester polyol-carboxylic acid adduct having pendant hydrophilic groups which comprises the reaction product of the ester polyol-carboxylic acid adduct of claim 1 and ammonia under aqueous conditions.

11. A water compatible ester polyol-carboxylic acid adduct having pendant hydrophilic groups which comprises the reaction product of the ester polyol-carboxylic acid adduct of claim 1 and a water soluble amine under aqueous conditions.

12. A water compatible ester polyol-carboxylic acid adduct having pendant quaternary ammonium groups which comprises the addition product, under aqueous conditions, of ammonia and the ester polyol-carboxylic acid adduct of claim 3.

13. A water compatible ester polyol-carboxylic acid adduct having pendant quaternary ammonium groups which comprises the reaction product of the ester polyol-carboxylic acid adduct of claim 4 and a member selected from the group consisting of ammonia and a water soluble amine under aqueous conditions, said amine being present in sufficient relative amount to react with at least all the pendant carboxyl groups of the said ester polyol-carboxylic acid adduct.

14. A water compatible ester polyol-carboxylic acid adduct having pendant quaternary ammonium groups which comprises the reaction product of the ester polyol-carboxylic acid adduct of claim 5 and a member selected from the group consisting of ammonia and a water soluble amine under aqueous conditions, said amine being present in sufficient relative amount to react with at least all the pendant carboxyl groups of the said ester polyol-carboxylic acid adduct.

15. A water compatible ester polyol-carboxylic acid adduct having pendant quaternary ammonium groups which comprises the reaction product of the ester polyol-carboxylic acid adduct of claim 8 and a member selected from the group consisting of ammonia and a water soluble amine under aqueous conditions, said amine being present in sufficient relative amount to react with at least all the pendant carboxyl groups of the said ester polyol-carboxylic acid adduct.

16. A water based paint composition comprising a non-volatile portion and a volatile portion, said non-volatile portion containing the water compatible ester polyol-carboxylic acid adduct of claim 15, and from about 10 to about 65 percent by volume of a pigment, based upon said non-volatile portion, and said volatile portion containing water and at least one organic solvent, said organic solvent being present in sufficient amount to permit dilution of the paint composition with water alone to a solution containing 5 percent by weight of said water compatible adduct, without causing said adduct to come out of solution.

17. A water based paint composition comprising a non-volatile portion and a volatile portion, said non-volatile portion containing the water compatible ester polyol-carboxylic acid adduct of claim 8 and a pigment, and said volatile portion containing water and at least one organic solvent.

18. A water based coating composition comprising a non-volatile portion and a volatile portion, said non-volatile portion containing the water compatible ester polyol-carboxylic acid adduct of claim 9.

19. A water based paint composition comprising a non-volatile portion and a volatile portion, said non-volatile portion containing the water compatible ester polyol-carboxylic acid adduct of claim 9 and a pigment.

References Cited

UNITED STATES PATENTS

| 2,969,336 | 1/1961 | Phillips et al. | 260—22 |
| 3,042,686 | 7/1962 | O'Brien et al. | 260—78.4 |
| 3,194,774 | 7/1965 | Nichols | 260—22 |
| 3,231,586 | 1/1966 | Tinsley | 260—22 |
| 3,247,137 | 4/1966 | McGary et al. | 260—348 |

DONALD E. CZAJA, *Primary Examiner.*

R. W. GRIFFIN, *Assistant Examiner.*

UNITED STATES PATENT OFFICE
CERTIFICATE OF CORRECTION

Patent No. 3,392,129                  July 9, 1968

Kenneth L. Hoy et al.

It is certified that error appears in the above identified patent and that said Letters Patent are hereby corrected as shown below:

Column 41, line 55, after "group" insert -- bonded --; line 66, "polycarbocyclic compound" should read -- polycyclic polyether polyol, --.

Signed and sealed this 30th day of December 1969.

(SEAL)
Attest:

Edward M. Fletcher, Jr.
Attesting Officer

WILLIAM E. SCHUYLER, JR.
Commissioner of Patents